United States Patent [19]

Sugiyama et al.

[11] 3,886,810
[45] June 3, 1975

[54] HYBRID POWER SYSTEM

[75] Inventors: Hiroshi Sugiyama, Hiratsuka; Toshio Hirota, Yokohama; Jun Kakei, Yokohama; Yoshiji Kabasawa, Yokohama, all of Japan

[73] Assignee: Nissan Motor Company Limited, Takara-machi, Kanagawa-ku, Yokohama, Japan

[22] Filed: Sept. 21, 1973

[21] Appl. No.: 399,373

[30] Foreign Application Priority Data
Sept. 22, 1972 Japan.............................. 47-94592
Sept. 22, 1972 Japan.............................. 47-94593
Oct. 31, 1972 Japan.............................. 47-108506

[52] U.S. Cl.................................. 74/751; 74/572
[51] Int. Cl............................................ F16h 33/02
[58] Field of Search ........ 74/751, 572; 60/698, 709, 60/711, 718; 180/54 R, 65, 66

[56] References Cited
UNITED STATES PATENTS

| 2,803,151 | 8/1957 | Clerk | 74/751 |
| 2,935,899 | 5/1960 | Nallinger | 74/572 X |
| 3,476,201 | 11/1969 | Swaine | 74/572 X |
| 3,665,788 | 5/1970 | Nyman | 74/572 X |
| 3,734,222 | 5/1973 | Bardwick | 180/54 R |

Primary Examiner—Martin P. Schwadron
Assistant Examiner—Allen M. Ostrager

[57] ABSTRACT

A hybrid power system for a motor vehicle, comprising a prime mover such as an internal combustion engine and a flywheel which is driven from the prime mover when an excess of power output is available from the prime mover and which is in driving connection to a transmission input shaft when the vehicle is to be driven under heavy load. The flywheel is selectively connected to or disconnected from the prime mover and/or the transmission input shaft in accordance with schedules which are dictated by an electric control unit responsive to various operational variables of the vehicle. The power system may be so arranged as to drive the engine when the engine is to be started.

5 Claims, 13 Drawing Figures

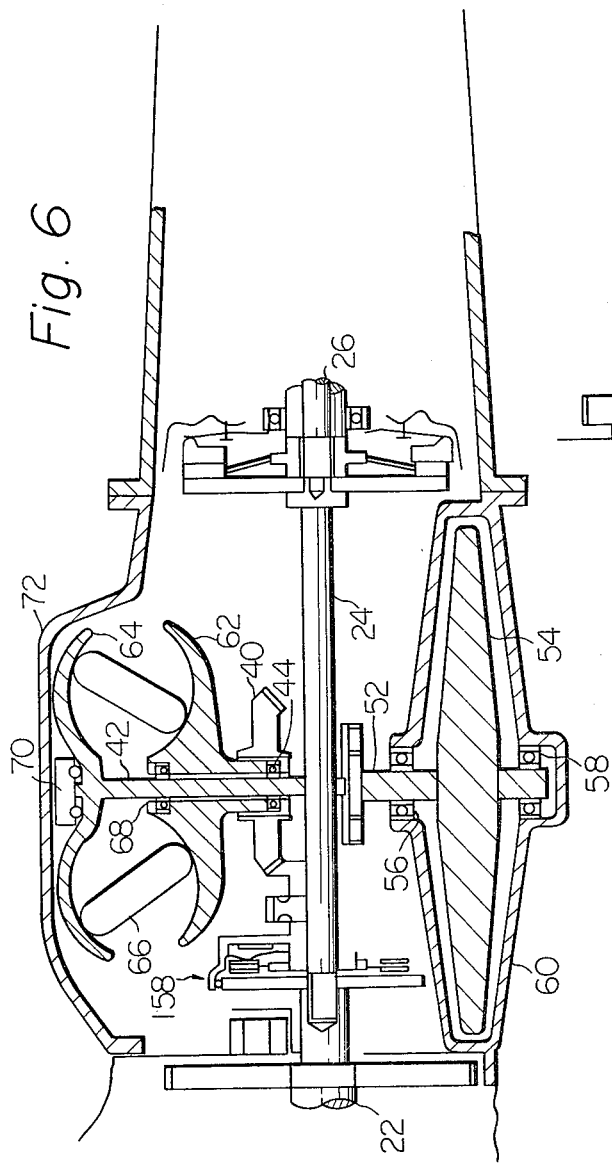
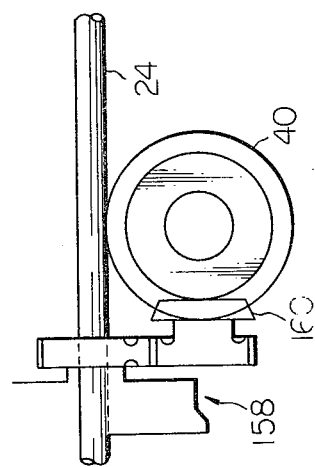

HYBRID POWER SYSTEM

The present invention relates to a hybrid power system to be used as a power plant of an automotive vehicle. More particularly, the invention relates to a hybrid power system having a prime mover such as an internal combustion engine and a flywheel which is initially driven from the prime mover and brought into driving connection to a vehicle driveline or to the prime mover in prescribed modes of operation of the vehicle. When an excess of power output is available from the prime mover as during low load operation of the prime mover, the flywheel is driven from the prime mover simultaneously as the vehicle is driven from the engine or by its inertia or held at a standstill so that rotational energy is stored on the flywheel. The rotational energy thus stored on the flywheel is discharged therefrom when the vehicle is driven with an increased power as when the vehicle is being started from a halt or climbing up a hill. When the vehicle is thus being driven under heavy load, the vehicle receives driving torques from both the prime mover and the flywheel. The prime mover is thus not subjected to a heavy load even when the vehicle is to be driven under heavy load conditions. The hybrid power system therefore contributes to reduction of the size and capacity of the prime mover to be incorporated therein and to the elimination of toxic compounds to be contained in the exhaust gases from the prime mover which typically is the internal combustion engine.

An important object of the present invention is to provide an improved hybrid power system having a sophisticated control arrangement.

In accordance with the present invention, there is provided a hybrid power system which comprises a prime mover, a power output shaft which is usually an input shaft of a power transmission, an intermediate shaft connected between the prime mover and the power output shaft, releasable coupling means connected between the intermediate shaft and the power output shaft for disconnecting the power output shaft from the intermediate shaft when the coupling means is actuated, a flywheel releasably engaging the intermediate shaft, and control means responsive to revolution speeds of the prime mover and the flywheel for producing a first signal representative of an amount of rotational energy stored on the flywheel and a second signal representative of a differential speed between the prime mover and the flywheel, the control means comprising a signal generator which is operative to produce a first control signal when the first signal is representative of a flywheel energy larger than a first reference level, a second control signal when the first signal is representative of a flywheel energy larger than a second reference level which is higher than the first reference level, and a third control signal when the first signal is representative of a flywheel energy larger than a third reference level which is higher than the second reference level, wherein the power output from the prime mover is imparted partly to the power output shaft and partly to the flywheel for increasing the energy of the flywheel when the second signal is smaller than a predetermined level and concurrently the first control signal is present and wherein the flywheel is disengaged from the prime mover in response to the third control signal and is brought into driving engagement with the power output shaft through the coupling means in response to the second control signal so that the power output shaft is driven from both the prime mover and the flywheel when the second control signal is present. Where desired, the hybrid power system of the above described nature may further comprise a stepless speed change unit which is operatively interconnected between the flywheel and the intermediate shaft for steplessly varying a ratio between the revolution speed of the intermediate shaft and the flywheel. In this instance, the control means may comprise a second signal generator which is adapted to be responsive to the condition of the speed change unit for producing a fourth control signal which is representative of the ratio between the speeds of rotation of the intermediate shaft and the flywheel, wherein the speed change unit is controlled in a manner that the speeds of rotation of the intermediate shaft and the flywheel are equalized, viz., the differential speed therebetween is eliminated when the flywheel is disengaged from the intermediate shaft or that the flywheel is accelerated or decelerated when the flywheel is driven by the intermediate shaft or in driving engagement with the intermediate shaft.

Second and third releasable coupling means may be interposed between the intermediate shaft and the flywheel. The second releasable coupling means is responsive to the first control signal for establishing driving connection from the intermediate shaft to the flywheel while the third releasable coupling means is responsive to the second control signal for establishing driving connection from the flywheel to the intermediate shaft. Or otherwise, only one releasable coupling means may be interposed between the intermediate shaft and the flywheel. The coupling means is responsive to the first and second control signals so as to establish driving connection from the intermediate shaft to the flywheel when the second control signal is present and to establish driving connection from the flywheel to the intermediate shaft when the second control signal is present.

Arrangements may further be made so that the control means is responsive to the degree of opening of the throttle of a fuel intake unit or carburetor of the prime mover and to the vacuum developed downstream of the throttle for controlling the degree of opening of the throttle independently of an accelerator pedal position when the power output from the prime mover is totally imparted to the flywheel with the power output shaft at rest or imparted partly to the flywheel and partly to the power output shaft or when the power output shaft is driven by both the prime mover and the flywheel.

While the hybrid power system of the nature above described is adapted to drive the vehicle selectively from the prime mover and/or the flywheel under various modes of operation of the vehicle, the power system may be arranged in such a manner to have the vehicle driven from the flywheel only when the vehicle is being started from a halt. In this instance, the hybrid power system may comprise a prime mover, a power output shaft, an intermediate shaft which is connected at one end to the prime mover through first releasable coupling means and at the other end to the power output shaft through second releasable coupling means, a flywheel engageable with the intermediate shaft for receiving rotational energy from the intermediate shaft or imparting its stored energy to the intermediate shaft, third releasable coupling means for selectively coupling or uncoupling the flywheel with or from the intermediate shaft, and control means responsive to speeds of rotation of the prime mover, the power output shaft and the flywheel for thereby controlling the first, second and third releasable coupling means so that the amount of rotational energy stored on the flywheel is maintained within a predetermined range, wherein the prime mover is stopped when the motor vehicle is brought to a halt and wherein the vehicle is driven by the energy stored on the flywheel when re-started from the halt.

Or otherwise, the hybrid power system may be so arranged that the prime mover is driven by the flywheel when the motor vehicle is being started from a temporary halt. In this instance, the hybrid power system may comprise a prime mover, a power output shaft, an intermediate shaft constantly connected at one end to the prime mover and disengageably connected at the other end to the power output shaft through first releasable coupling means, a flywheel which is engageable with the intermediate shaft for receiving rotational energy from the intermediate shaft or imparting it stored energy to the intermediate shaft, second releasable coupling means for selectively coupling or uncoupling the flywheel with or from the intermediate shaft, and control means responsive to the speeds of rotation of the prime mover, the power output shaft and the flywheel for controlling the first and second coupling means so that the amount of energy stored on the flywheel is maintained within a predetermined range, wherein the prime mover is stopped when the motor vehicle is brought to a halt and wherein the prime mover is re-started by the energy stored on the flywheel when the vehicle is re-started from the halt.

Other features and objects of the hybrid power system according to the present invention will become more apparent from the following description taken in conjunction with the accompanying drawings in which:

FIG. 6 is a longitudinal sectional view showing another modification of the embodiment illustrated in FIG. 1;

FIG. 7 is a plan view showing a gear arrangement which forms par of the power system illustrated in FIG. 6;

Figure 1:
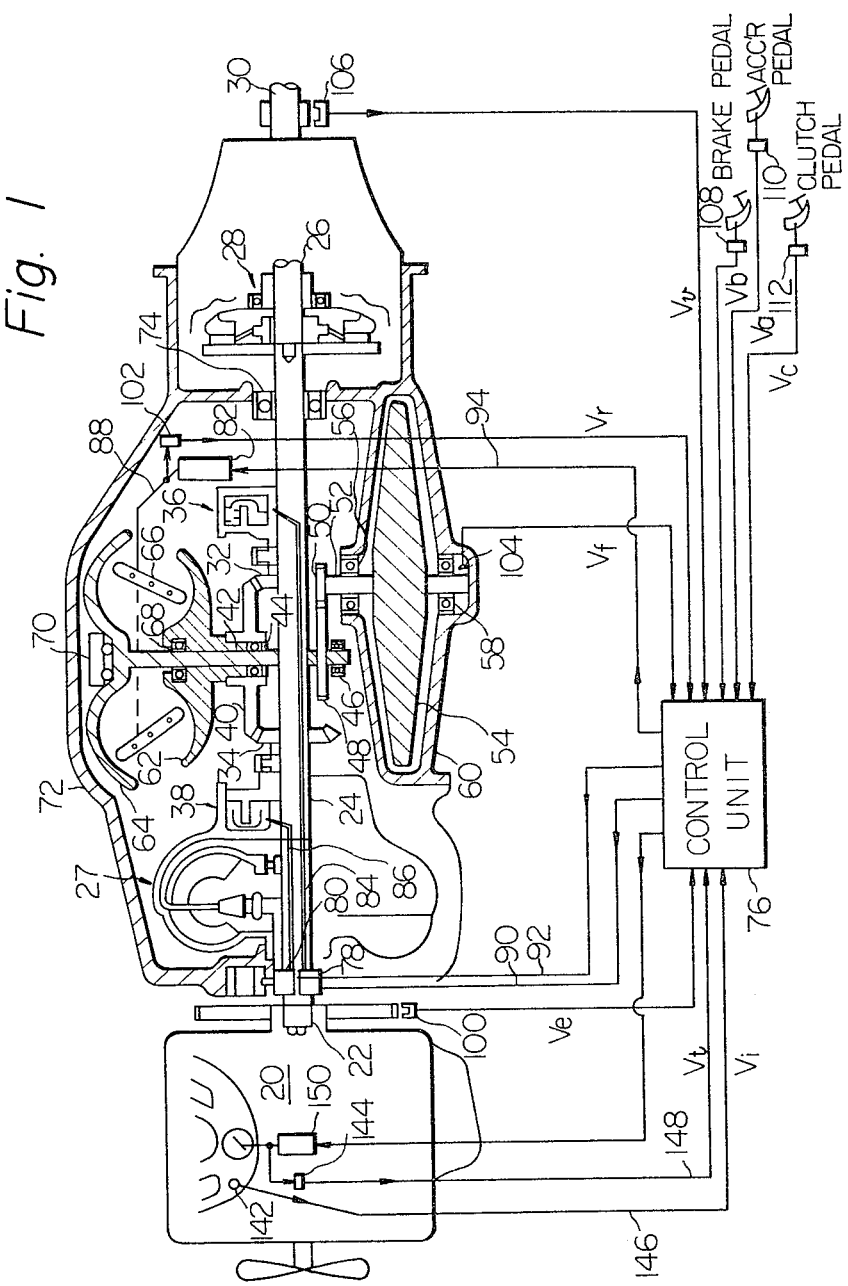
FIG. 1 is a longitudinal sectional view, partly in a block form to shown an electric arrangement, of a preferred embodiment of the hybrid power system according to the present invention.

Reference will now be made to the drawings, first to FIG. 1 which illustrates a first preferred embodiment of the hybrid power system according to the present invention. The hybrid power system includes, as shown, a prime mover 20 which usually is an internal combustion engine having a crankshaft 22. The crankshaft 22 of the engine 20 is drivingly connected to an intermediate shaft 24 preferably through a torque converter 27. The intermediate shaft 24, in turn, is connected through a transmission input shaft 26 through a clutch 28. The transmission input shaft 26 is connected to a propeller shaft 30 so as to provide a power train between the engine crankshaft 22 and driving wheels of the motor vehicle, as is customary.

The intermediate shaft 24 thus intervening between the engine crank shaft 22 and the transmission input shaft 26 carries thereon first and second pinion gears 32 and 34, respectively, which are rotatable on the shaft 24. The first and second pinion gears 32 and 34 are associated with first and second clutches 36 and 38, respectively, and are made rotatable with the intermediate shaft 24 when the clutches are in coupled conditions. The two pinion gears 32 and 34 are in constant mesh with a bevel gear 40 which is rotatable on a cross shaft 42 through a bearing 44, the cross shaft 42 extending at right angles to the intermediate shaft 24 and rotatably supported oin a bearing 46. The cross shaft 42 carries at one end thereof a gear 48 which is in constant mesh with a gear 50 on a shaft 52 of a flywheel 54. The shaft 52 of the flywheel 54 is journalled on bearings 56 and 58 received in a flywheel housing 60.

A variable driving connection is established between the bevel gear 40 and the flywheel 54 by a stepless speed change unit which consists essentially of spaced, first and second rotary members 62 and 64, respectively, and a roller 66 which is in rolling engagement with the two rotary members 66. The first rotary member 62 is rigidly connected to or integral with the bevel gear 40 and is consequently rotatable together with the bevel gear 40 on the cross shaft 42 through a bearing 68. The second rotary member 64, on the other hand, is rigidly connected to or integral with the cross shaft 42 and is thus rotatable with the cross shaft 42 and accordingly with the flywheel 54 through the meshing gears 48 and 50. The second rotary member 64 is rotatably held in position by means of a bearing retainer 70. The roller 66 is movable between and relative to the rotary members 62 and 66 so that the driving effort is transmitted between the rotary members with a speed ratio which is steplessly variable depending upon the relative position of the roller 66. The construction and operation of the stepless speed change unit above described are well known in the art and, as such, no further description thereof may be herein incorporated.

The intermediate shaft 24 and all the parts and units carried on the shaft 24 are enclosed within a stationary housing 72. Designated by reference numeral 74 is a bearing which receives therein a tail end of the intermediate shaft 24.

The first and second clutches 36 and 38, respectively, and the roller 66 of the speed change unit are controlled from an electric control unit 76 to be described.

When the first clutch 36 is coupled with the second clutch 38 uncoupled, the first pinion gear 32 is brought into engagement with the intermediate shaft 24 so that the driving connection is established from the intermediate shaft 24 to the flywheel 54 through the first pinion gear 32, the bevel gear 40, the first rotary member 62 of the speed change unit, the roller 66 of the unit, the second rotary member 64 of the unit, the cross shaft 42, the gears 48 and 50 and the shaft 52 of the flywheel 54 in this sequence. Under these conditions, the flywheel 54 is driven from the intermediate shaft 24 at a revolution speed which is dictated by the position of the roller 66 relative to the first and second rotary members 62 and 64, respectively, of the stepless speed change unit. When the bevel gear 40 is thus driven by the first pinion gear 32, the second pinion gear 34 on the intermediate shaft 24 is also driven from the bevel gear 40 but no driving engagement is established between the second pinion gear 34 and the intermediate shaft 24 because the second clutch 38 is held in an uncoupled condition maintaining the second pinion gear 34 freely rotatable on the intermediate shaft 24. The first clutch 36 is coupled under the control of the electric control unit 76 when it is desired to have the flywheel 54 driven from the engine 20 or, in other words, when rotational energy is to be stored in the flywheel 64. Thus, the driving effort from the engine 20 is totally consumed in driving the flywheel 54 of the transmission clutch 28 is uncoupled or, if the transmission clutch 28 is in a coupled condition, consumed partly in driving the flywheel 54 and partly in driving the transmission input shaft 26.

The second clutch 38 is, on the other hand, so intended as to have the flywheel 54 discharge its driving torque to the intermediate shaft 24 so that the intermediate shaft is driven from both the engine 20 and the flywheel 54 if the engine is operating or only from the flywheel if the engine is at rest. When, thus, the second clutch 38 is coupled and concurrently the first clutch 36 is uncoupled, the second pinion gear 34 is brought into driving engagement with the intermediate shaft 24 so that a driving connection is established from the flywheel 54 to the intermediate shaft 24 through the shaft 52 of the flywheel 54, the gears 50 and 48, the cross shaft 42, the second rotary member 64 of the speed change unit, the roller 66 of the unit, the first rotary member 62 of the unit, the bevel gear 40, and the second pinion gear 34 in this sequence. Under these conditions, no driving effort is transmitted from the intermediate shaft 24 to the first pinion gear 32 because the first clutch 36 is maintained in an uncoupled condition.

The first and second clutches 36 and 38, respectively, are selectively coupled and uncoupled and, furthermore, the roller 66 of the stepless speed change unit is moved relative to the first and second rotary members 62 and 64, respectively, by means of solenoid-operated actuators 78, 80, and 82 which are operatively associated with the clutches 36 and 38 and the roller 66 through mechanical linkages 84, 86 and 88, respectively, which are only schematically illustrated in FIG. 1. These actuators 78, 80 and 82, in turn, are electrically connected through lines 90, 92 and 94, respectively, to the electric control unit 76 so as to be selectively energized and de-energized from the control unit 76. The electric control unit 76 may be so arranged as to be operable on any desired operational variables of the motor vehicle under various modes of operation of the vehicle but, in the embodiment herein shown, the unit is assumed by preference to be responsive to (1) the revolution speed of the crankshaft 22 of the engine 20, (2) the position of the roller 66 of the stepless speed change unit relative to the first and second rotary members 62 and 64, respectively, thereof, (3) the revolution speed of the flywheel 54, (4) the vehicle speed which may be represented by the speed of rotation of the propeller shaft 30, (5) the position of the brake pedal, (6) the depth of the accelerator pedal depressed, and (7) the position of the clutch pedal associated with the transmission input clutch 30.

To collect pieces of information representative of these seven operational variables of the motor vehicle, sensors are provided which include an engine speed sensor 100 associated with the crankshaft 22 of the engine 20 for producing a signal voltage $Ve$ proportional to the revolution speed of the engine crankshaft 22, a roller position sensor 102 associated with the mechanical linkage 88 between the roller 66 of the speed change unit and the actuator 82 thereof for producing a signal voltage $Vr$ representative of the position of the roller 66 relative to the rotary members 62 and 64 of the speed change unit, a flywheel speed sensor 104 associated with the shaft 52 of the flywheel 54 for producing a signal voltage $Vf$ proportional to the revolution speed of the flywheel 54, a vehicle speed sensor 106 associated with the propeller shaft 30 for producing a signal voltage $Vv$ proportional to the revolution speed of the propeller shaft 30, a brake position sensor 108 associated with the brake pedal for producing a signal voltage $Vb$ when the brake pedal is depressed, an accelerator pedal stroke sensor 110 associated with the accelerator pedal for producing a signal voltage $Va$ which is proportional to the depth of the accelerator depressed, and a clutch pedal position sensor 112 associated with the clutch 28 in the transmission for producing a signal voltage $Vc$ when the clutch pedal is depressed to uncouple the clutch 28. The signal voltage $Vr$ from the roller position sensor 102 is proportional to a ratio between the revolution speeds of the first and second rotary members 62 and 64, respectively, of the speed change unit.

Figure 2:
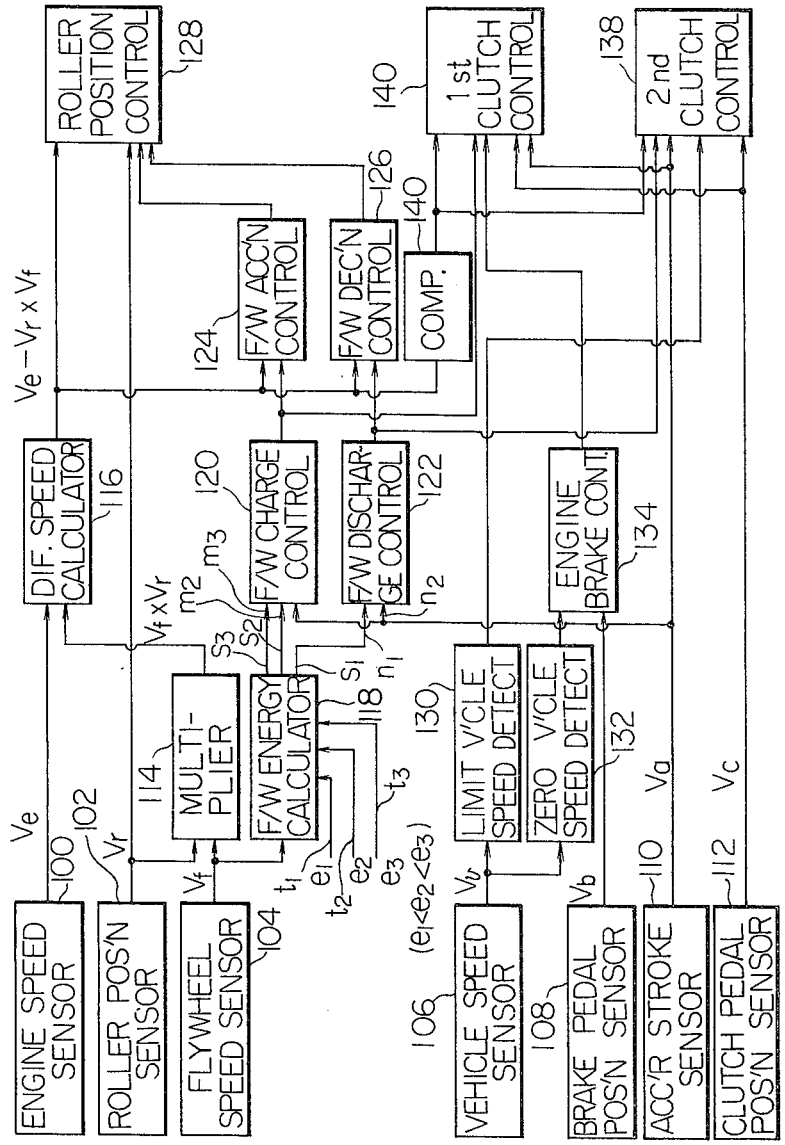
FIGS. 2 and 3 are block diagrams showing preferred examples of the electric control arrangement for the hybrid power system illustrated in FIG. 1.

A preferred example of the electric control unit 76 operating on these various signals is illustrated in FIG. 2. Referring to FIG. 2, the signal voltages $Vr$ and $Vf$ produced from the roller position sensor 102 and the flywheel revolution speed sensor 104, respectively, are delivered to a multiplier circuit 114 in which the voltage $Vf$ representing the revolution speed of the flywheel 54 is multiplied by the voltage $Vr$ representing the speed change ratio selected by the roller 66 of the speed change unit. The multiplier circuit 114 thus produces an output voltage representative of the flywheel revolution speed which is converted into the revolution speed of the input shaft 24. The output voltage from the multiplier circuit 114 and the signal voltage $Ve$ from the engine speed sensor 100 are delivered to a differential speed calculator circuit 116 so that a differential between the voltages from the sensor 100 and the multiplier circuit 114 is derived. The differential speed calculator circuit 116 thus delivers an output voltage which is representative of a differential speed between the engine crankshaft 22 and the flywheel 54.

The signal voltage $Vf$ from the flywheel speed sensor 104 is further delivered to a flywheel energy calculator circuit or a comparator 118 in which an amount of energy stored in the flywheel 54 is calculated from the revolution speed of the flywheel and is compared with predetermined energy levels. Thus, the flywheel energy calculator circuit 118 has three output terminals $s_1$, $s_2$ and $s_3$ and three reference voltage input terminals $t_1$, $t_2$ and $t_3$ which are respectively associated with the output terminals $s_1$, $s_2$ and $s_3$. The reference voltage input terminals $t_1$, $t_2$ and $t_3$ are impressed with fixed reference voltages $e_1$, $e_2$ and $e_3$, respectively, where $e_1 < e_2 < e_3$. As will be understood more clearly as the description proceeds, the first reference voltage $e_1$ is of such a level as to indicate the rotational energy is stored in the flywheel 54 in an amount which is still dischargeable therefrom, the second reference voltage $e_2$ is of such a level as to indicate the energy stored in the flywheel is greater than the level $e_1$ but should be replenished, and the reference voltage $e_3$ is of such a level as to indicate a sufficient amount of rotational energy is stored in the flywheel so that the flywheel need not be charged with additional energy. The signal voltage $Vf$ supplied from the flywheel speed sensor 104 is thus compared with the three different reference voltages $e_1$, $e_2$ and $e_3$ an output signal appears on the first output terminal $s_1$ when the voltage $Vf$ is higher than the reference voltage $e_1$, on the second output terminal $s_2$ when the voltage $Vf$ is higher than the reference voltage $e_2$ or on the third output terminal $s_3$ when the voltage $Vf$ is higher than the reference voltage $e_3$.

A flywheel charge circuit 120 has three input terminals $m_1$, $m_2$ and $m_3$ of which the terminal $m_1$ is connected to the output terminal of the accelerator pedal stroke sensor 110 and the terminals $m_2$ and $m_3$ are connected to the output terminals $s_2$ and $s_3$, respectively, of the flywheel energy calculator circuit 118. The charge control circuit 120 is actually a logical circuit producing an output in the presence of a voltage on its input terminal $m_2$ and in the concurrent absence of voltages on its input terminals $m_1$ and $m_3$. No output is thus produced from the charge control circuit 120 even when a voltage is impressed on the input terminal $m_2$ if the accelerator stroke sensor 110 is producing an output voltage. When a voltage is present on the input terminal $m_3$, the charge control circuit 120 does not produce an output voltage irrespective of the condition of the accelerator stroke sensor 110.

In parallel to the charge control circuit 120 is provided a flywheel discharge control circuit 122 which has two input terminals $n_1$ and $n_2$. The input terminal $n_1$ is connected to the output terminal $s_1$ of the flywheel energy calculator circuit 118 while the input terminal $n_2$ is connected to the accelerator pedal stroke sensor 110. The flywheel discharge control circuit 122 is also a logical AND circuit producing an output when input voltages are impressed on both of its input terminals $n_1$ and $n_2$. The output terminals of the flywheel charge and discharge control circuits 120 and 122 are connected to input terminals of flywheel acceleration and deceleration control circuits 124 and 126, respectively, each of which has another input terminal connected to the output terminal of the differential speed calculator circuit 116. The flywheel acceleration control circuit 124 thus receives from the differential speed calculator circuit 116 the signal voltage representing the differential speed between the engine crankshaft 22 or the intermediate shaft 24 and the flywheel 54 and, when it responds to the output voltage from the flywheel charge control circuit 120, produces an output voltage so as to cause the flywheel 54 to be charged with the rotational energy until a prescribed differential speed is achieved between the engine crankshaft 22 and the flywheel 54. The flywheel deceleration control circuit 126 is also responsive to the signal voltage from the differential speed calculator circuit 116 and, when triggered by the flywheel discharge control circuit 122, produces an output voltage so as to cause the flywheel 54 to be discharged until a prescribed differential speed is achieved between the engine crankshaft 22 and the flywheel 54.

The output voltages produced from the roller position sensor 102, the differential speed calculator circuit 116, the flywheel acceleration control circuit 124 and the flywheel deceleration control circuit 126 are all delivered to a roller position control circuit 128 for controlling the actuator 82 for the roller 66 of the stepless speed change unit in a manner to equalize the speeds of revolution of the engine crankshaft 22 and the flywheel, to have the flywheel 54 charged with additional rotational energy from the engine crankshaft 22, or to have the intermediate shaft 24 driven from the flywheel 54, depending upon the voltages impressed on the roller position control circuit 128. When the flywheel 54 is to be charged with the additional energy or the energy stored on the flywheel 54 is to be discharged therefrom, the roller 66 of the stepless speed change unit is moved relative to the rotary members 62 and 64 in a direction and over a distance which are dictated by the output voltage produced from the flywheel acceleration control circuit 124 or the flywheel deceleration control circuit 126, respectively.

The signal voltage $Vv$ produced from the vehicle speed sensor 106 is delivered to a limit vehicle speed detector 130 and a zero vehicle speed detector 132. The limit vehicle speed detector 130 produces an output voltage when the signal voltage $Vv$ representing the vehicle speed is higher than a predetermined level for causing the flywheel 54 to cease discharging its stored energy to the intermediate shaft 24 when the vehicle is driven at a speed higher than a predetermined level. The zero vehicle speed detector 132, on the other hand, produces an output voltage when the signal voltage $Vv$ is indicative of a zero vehicle speed, viz., when the motor vehicle is at a standstill. The output voltage from the zero vehicle speed detector 132 and the signal voltage $Vb$ from the brake pedal position sensor 108 are delivered to an engine brake control circuit 134 which is so arranged as to produce an output voltage in the absence of the output voltage from the zero vehicle speed detector 132 and in the presence of the signal voltage $Vb$ from the brake position sensor 108, viz., when the motor vehicle is being driven and concurrently the brake pedal is depressed.

The signal voltages $Va$ and $Vc$ produced from the accelerator stroke sensor 110 and the clutch position sensor 112 are delivered direct to input terminals of first and second clutch control circuits 136 and 138, respectively. The first clutch control circuit 136 has other input terminals connected to the output terminals of the flywheel charge control circuit 120 and the engine brake control circuit 134 while the second clutch control circuit 138 has other input terminals connected to the output terminals of the flywheel discharge control circuit 122 and the limit vehicle speed detector 138. A comparator 140 has an input terminal connected to the output terminal of the differential speed calculator circuit 116 and an output terminal connected to the clutch control circuits 136 and 138. The comparator 140 is operative to compare the output voltage from the differential speed calculator circuit 116 with a predetermined reference voltage and delivers a control voltage to the clutch control circuits 136 and 138 when the voltage representing the differential speed between the engine crankshaft 22 and the flywheel 54 is lower than the reference voltage. The first clutch control circuit 136 or the second clutch control circuit 138 is thus triggered depending upon the signal delivered from the flywheel charge control circuit 120 or the flywheel discharge control circuit 122, respectively. The first and second clutch control circuits 136 and 138 are connected to the actuators 78 and 80 of the first and second clutches 36 and 38, respectively.

The first clutch 36 is thus coupled when the first clutch control circuit 138 delivers an output to the actuator 78 associated with the first clutch 36. The output is delivered from the first clutch control circuit 136 when the following conditions are concurrently established:

1. The rotational energy stored on the flywheel 54 is higher than the level $e_2$ and lower than the level $e_3$ with the accelerator pedal released so that an output voltage is present on the output terminal of the flywheel charge control circuit 120.

2. The differential speed between the engine crankshaft 22 and the flywheel 54 is lower than the predetermined level so that the comparator 140 is producing its output. The output signal from the comparator 140 therefore disappears when the differential speed becomes larger than the predetermined level or, in other words, the speed of revolution of the flywheel 54 is increased providing such a differential speed.

3. The accelerator pedal is released so that no signal voltage is produced from the accelerator pedal position sensor 110.

4. The clutch pedal is released to leave the transmission input clutch 28 coupled so that no signal voltage is produced from the clutch position sensor 110.

5. The brake pedal is released so that the engine brake control circuit 134 is inoperative to deliver its output.

The second clutch control circuit 138, on the other hand, delivers an output to the actuator 80 for the second clutch 38 when the following conditions are concurrently established:

1. The rotational energy stored on the flywheel 54 is higher than the level $e_1$ with the accelerator pedal released so that the flywheel discharge control circuit 122 delivers an output voltage to the second clutch control circuit 138.

2. The differential speed between the engine crankshaft 22 and the flywheel 54 is lower than the predetermined level so that the comparator 140 is producing its output. The output signal from the comparator 140 therefore disappears when the differential speed becomes larger than the predetermined level or, in other words, the revolution speed of the flywheel 54 is reduced providing such a differential speed.

3. The accelerator pedal is being depressed so that the flywheel charge control circuit 120 is maintained inoperative and the signal voltage $Va$ is delivered therefrom.

4. The vehicle speed is lower than the predetermined level so that the limit vehicle speed detector 130 delivers no output voltage.

5. The clutch pedal is released so that no signal voltage is produced from the clutch position sensor 110.

Table I shows the conditions of the clutches 28, 36 and 38 under various modes of operation of the vehicle and the engine, wherein the signs $o$ and $x$ indicate the coupled and uncoupled conditions, respectively, of each clutch.

Table I

| Modes of Operation | | Clutches | | |
|---|---|---|---|---|
| | | 26 | 36 | 38 |
| Vehicle at rest | Engine at idle (Flywheel need not be charged) | x | x | x |
| | Flywheel to be charged (should be driven from engine) | x | o | x |
| | Brake pedal depressed while flywheel is being charged | x | o | x |
| | Vehicle ready to start with clutch 26 uncoupled and trans'n gear shifted from neutral | x | x | x |
| Acceleration | Vehicle to be driven from both engine and flywheel | x | o | x |
| | Clutch 26 uncoupled to shift transmission gears, causing flywheel to stop discharging | x | x | x |
| | Vehicle driven at approx. max. speed without charging or discharging of flywheel | x | x | o |
| | Vehicle accelerated at medium speed and flywheel not discharging its energy | x | x | o |
| Normal cruising | Flywheel may be driven by excess of engine output depending on flywheel energy level | o | x | o |
| | Vehicle driven at approx. max. speed without charging or discharging of flywheel | x | x | o |
| Deceleration (Braking) | Engine braked upon by vehicle, without charging or discharging of flywheel | x | x | o |

It will be understood from Table I that the clutch 36 is coupled when the engine is operating at part of its full capacity while the vehicle is at rest or being driven under normal conditions and, simultaneously, the amount of energy stored on the flywheel is deficient and that the clutch 38 is coupled when it is required that the vehicle be driven both from the engine and flywheel for being accelerated.

The amount of energy stored on the flywheel 54 is, as previously discussed, calculated from the revolution speed of the flywheel and is compared with three predetermined values which are represented by the voltages $e_1$, $e_2$ and $e_3$ so that three different control signals are produced either concurrently or separately depending upon the energy level of the flywheel. When, thus, a control signal is produced which is representative of the amount of energy of the flywheel higher than the level $e_2$ and lower than the level $e_3$ while the vehicle is at a standstill or being driven under normal conditions, the power output of the engine is at least partially imparted to the flywheel for adding to the amount of energy of the flywheel. When, under this condition, the amount of energy of the flywheel reaches the level $e_3$, then another control signal is produced so as to interrupt the driving of the flywheel from the engine. When, on the other hand, a control signal is present indicating the condition in which the flywheel is left with rotational energy higher than the level $e_1$ or in such a quantity as to be dischargeable from the flywheel, the vehicle is driven from both the engine and the flywheel during starting from the rest or climbing up a hill, viz., under conditions in which the engine is to be heavily loaded.

The speed of revolution of the flywheel 54 driving the intermediate shaft 24 or driven by the shaft 54 is varied by the movement of the roller 66 relative to the rotary members 62 and 64 of the stepless speed change unit as previously discussed. The roller 66 is responsive to the differential speed between the engine crankshaft 22 and the flywheel 54 and is controlled in such a manner that the differential speed is reduced to zero when the flywheel is disengaged from the intermediate shaft or the flywheel is accelerated or decelerated when the flywheel is to be charged with addtional energy or to discharge its stored energy.

Figure 3:
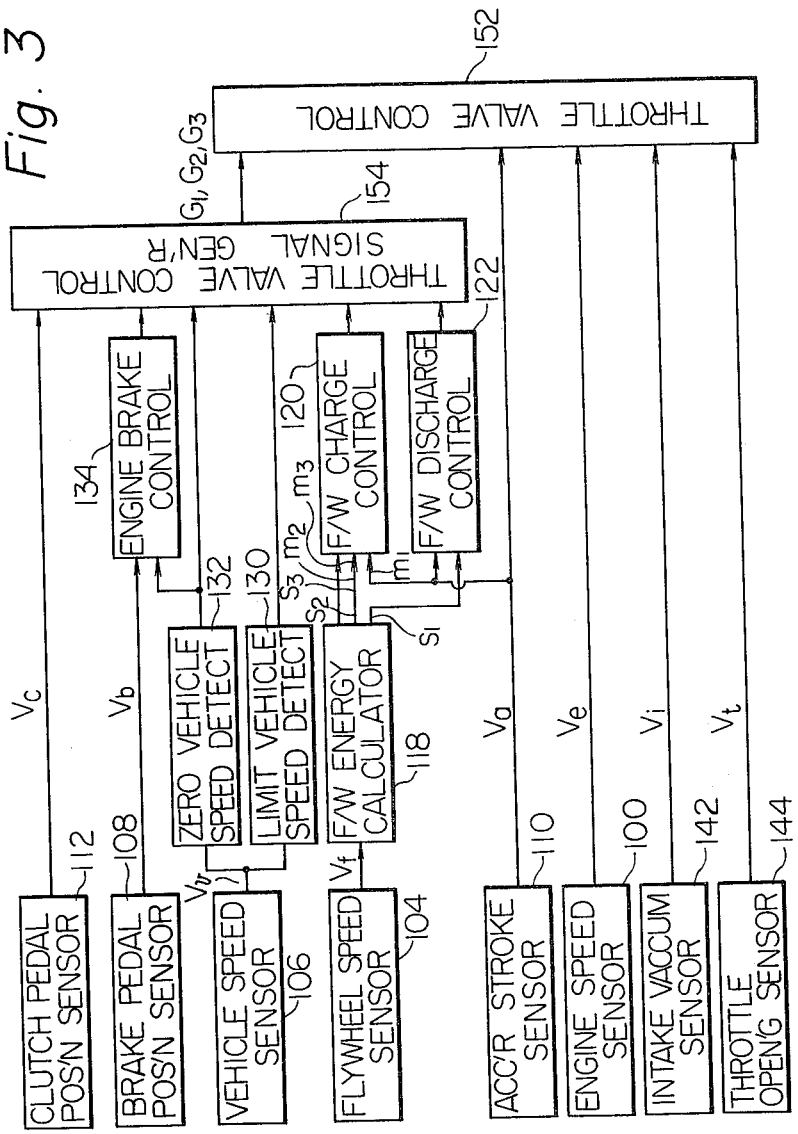

When either the clutch 36 or the clutch 38 is in a coupled condition so that the flywheel 54 is driven from the engine while the vehicle is held at a standstill or being driven under light load or the flywheel discharges its stored energy under heavy load, the power output from the engine is not transmitted or only partly transmitted to the driveline and, for this reason, it is preferably that the throttle valve of the engine be controlled independently of the movement of the accelerator pedal. FIG. 3 illustrates a preferred example of the electric control arrangement adapted to achieve this purpose. The arrangement is herein assumed to form part of the control unit 76 shown in FIG. 1 and is responsive not only to the revolution speeds of the engine crankshaft 22 and the flywheel 54, the speed of the motor vehicle, the positions of the clutch and brake pedals and the travel of the accelerator pedal but the vacuum in the intake manifold and the degree of opening of the throttle of the engine 20. Sensors 142 and 144 are, therefore, provided so as to detect the vacuum in the intake manifold of the engine 20 and the degree of opening of the throttle valve of the engine, as seen in FIG. 1. The vacuum and throttle opening sensors 142 and 144 are electrically connected through lines 146 and 148, respectively, to the control unit 76 so that the throttle valve is controlled by an actuator 150 which is connected to one of the output terminals of the control unit 76.

As more specifically illustrated in FIG. 3, the vacuum and throttle opening sensors 142 and 144, respectively, and the previously described engine speed and accelerator stroke sensors 100 and 110, respectively, are connected directly to input terminals of a throttle valve control circuit 152 and deliver to the circuit 152 a signal voltage $Vi$ proportional to the vacuum in the intake manifold of the engine 20 and a signal voltage $Vt$ proportional to the degree of opening of the throttle of the engine as well as the signal voltages $Ve$ and $Va$ which are indicative respectively of revolution speed of the engine and the position of the accelerator pedal. The throttle valve control circuit 152 has another input terminal connected to an output terminal of a throttle valve control signal generator circuit 154 which, in turn, has input terminals connected to the output terminals of the previously described clutch pedal position sensor 112, the flywheel charge and discharge control circuits 120 and 122, respectively, the limit vehicle speed detector 130, the zero vehicle speed detector 132, and the engine brake control circuit 134. The throttle valve control signal generator 154, thus, responsive either directly or indirectly to the signal voltages $Vf$, $Vv$, $vb$ and $Vc$ from the flywheel speed sensor 104, the vehicle speed sensor 106, the brake pedal position sensor 108 and the clutch pedal position sensor 112, respectively. In response to these signals, the throttle valve control signal generator 154 delivers three different output signals $G_1 G_2$ and $G_3$ depending on the modes of operation of the motor vehicle. When the zero vehicle speed detector circuit 132 and the flywheel charge control circuit 120 are delivering their output voltages, viz., the flywheel 54 is being driven from the engine while the motor vehicle is held at rest, the throttle valve control signal generator 154 produces the signal $G_1$ for triggering the throttle valve control circuit 152. The throttle valve control circuit 152 thus causes the throttle valve control actuator 150 to move the throttle valve of the engine 20 to an angular position providing a degree of opening of the throttle prescribed for the detected engine speed and the detected vacuum in the intake manifold. When, on the other hand, the motor vehicle is being started from the rest or being accelerated during cruising so that the flywheel 54 is brought into driving engagement with the intermediate shaft 24, the motor vehicle is driven from both the engine 20 and the flywheel 54 as previously noted. Under these condition, the throttle valve control signal generator 154 delivers the signal $G_2$ so that the throttle valve control circuit 152 is operative to cause the actuator 150 to move the throttle valve of the engine to a position reducing the degree of opening of the throttle which is prescribed for the detected engine speed and the detected vacuum in the intake manifold. The signal $G_2$ is produced in the presence of the output voltages from the accelerator stroke sensor 110 and the flywheel discharge control circuit 122 and in the absence of the output voltage from the limit vehicle speed detector circuit 130. If, in this instance, the limit vehicle speed detector circuit 130 issues and output in response to the vehicle speed approaching the maximum value during the heavy load operation of the vehicle, then the signal $G_2$ disappears and accordingly, the throttle valve control circuit 152 becomes inoperative so that the throttle valve of the engine is controlled by the accelerator pedal. When, furthermore, the motor vehicle is driven under relatively low load condition with the accelerator pedal depressed to a limited depth and if the amount of energy stored on the flywheel 54 is lower than the previously described predetermined level $e_2$ so that the flywheel 54 is driven from the engine 20, then the throttle valve control signal generator circuit 154 delivers the signal $G_3$ to the throttle valve control circuit 152 which accordingly causes the actuator 150 to move the throttle valve to a position providing a degree of opening of the throttle prescribed for the detected engine speed and the detected vacuum in the intake manifold of the engine. The signal $G_3$ is produced in the absence of the output from the accelerator pedal stroke sensor 110 and the zero vehicle speed detector circuit 132 and in the presence of the output from the flywheel charge control circuit 120. The signal $G_1$, $G_2$ or $G_3$ from the throttle valve control signal generator circuit 154 disappears when the brake pedal or the clutch pedal is depressed by the driver so that an output from either of the engine brake control circuit 134 and the clutch pedal position sensor 112 is present. When the throttle valve control circuit is held inoperative, the throttle valve of the engine is moved in accordance with the amount of movement of the accelerator pedal, viz., independently of the actuator 150.

Figures 4, 5:
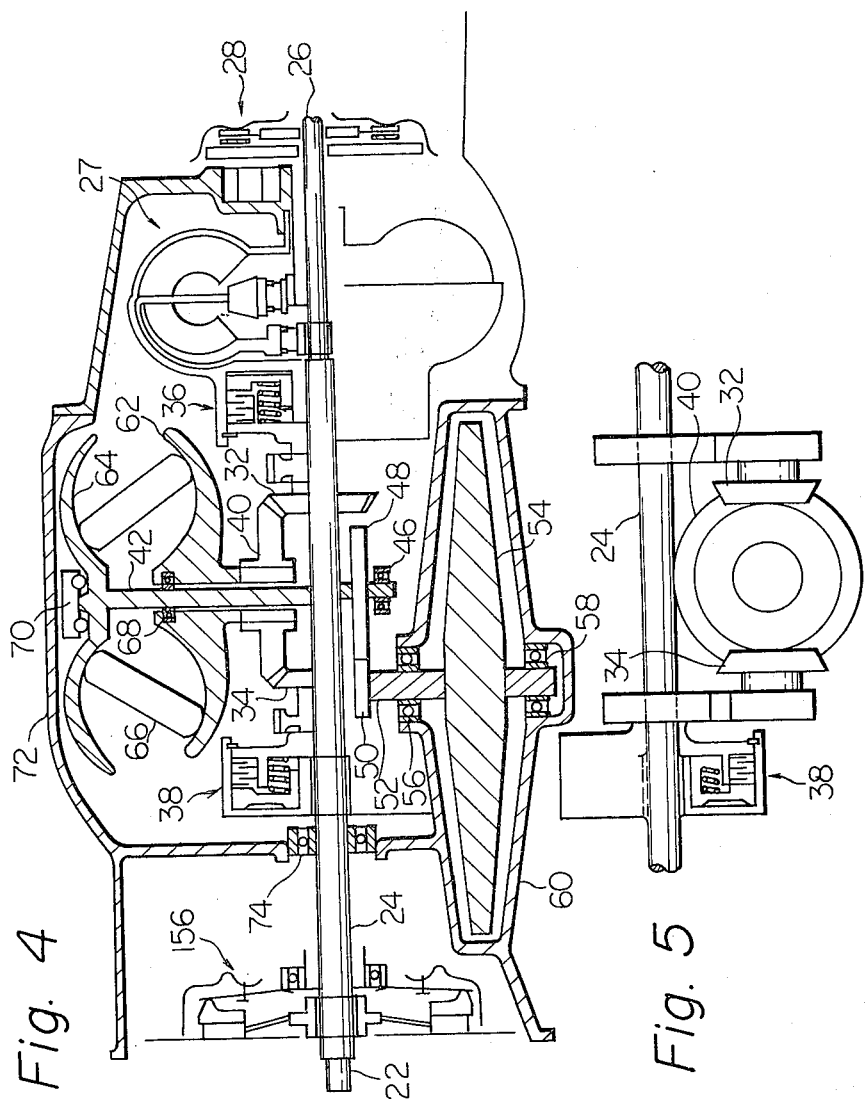
FIG. 4 is a longitudinal sectional view showing a modification of the embodiment illustrated in FIG. 1.
FIG. 5 is a plan view showing a gear arrangement forming part of the power system illustrated in FIG. 4.

A modification of the embodiment of the hybrid power system thus far described are now illustrated in FIG. 4 and 5, wherein those parts and units having counterparts in the embodiment of FIG. 1 are designated by like reference numerals. In the embodiment herein shown, the torque converter 27 is assumed to be connected between the intermediate shaft 24 and the input shaft 26 of the transmission. The hybrid power system shown in FIGS. 4 and 5 comprises, in addition to those parts and units previously described, a fourth clutch 156 which is interposed between the intermediate shaft 24 and the engine crankshaft 22 so that the intermediate shaft 24 is connected and disconnected selectively depending upon the condition of the clutch 156. The clutch 156 is controlled by means which are responsive to the position of the brake pedal, the amount of energy stored on the flywheel 54 and the speed of the motor vehicle and is uncoupled when the brake pedal is depressed with the transmission input clutch 28 and the clutch 36 kept coupled and if the amount of rotational energy on the flywheel is deficient to drive the vehicle without the aid of the power output from the engine. Under these conditions, a braking effort is imparted from the flywheel 54 to the motor vehicle through the intermediate shaft 24 and the transmission input shaft 26 because the clutch 36 is coupled with the flywheel charge control circuit 120 (FIG. 2) operative to produce its output. In other words, the clutch 156 is adapted to effect the so-called "regenerative braking" on the motor vehicle when uncoupled under the described conditions. The clutches 28, 36, 38 and 156 are thus coupled and uncoupled in accordance with the schedules indicated by Table II.

Table II

| Modes of Operation | | Clutches | | | |
|---|---|---|---|---|---|
| | | 26 | 36 | 38 | 156 |
| Vehicle at rest | Engine at idle (Flywheel need not be charged) | x | x | x | x |
| | Flywheel to be charged, i.e. driven from engine | x | o | x | o |
| Acceleration | Vehicle to be driven from engine and flywheel | o | x | o | o |
| Normal cruising | Flywheel may be driven by excess of engine output depending upon flywheel energy level | o | o | x | o |
| Deceleration (Braking) | Regenerative braking to be effective | o | o | x | x |
| | Engine braked upon by vehicle with sufficient energy stored on flywheel | o | x | x | o |

FIGS. 6 and 7 illustrate another modification of the embodiment of the hybrid power system shown in FIG. 1, wherein the flywheel 54 is assumed to be carried on a shaft 52 which is directly connected to the cross shaft 42. The embodiment herein shown is characterized in that only one clutch 158 is operatively interposed between the intermediate shaft 24 and the flywheel 54. The clutch 158 is thus associated on one side with the intermediate shaft 24 and on the other side with a pinion 160 which is in constant mesh with the bevel gear 40. When the clutch 158 is coupled, the flywheel 54 is driven from intermediate shaft 24 if the torque of the flywheel is being overpowered by the torque of the intermediate shaft 24 and, conversely, drives the intermediate shaft 24 when the torque of the flywheel is overpowering the torque of the intermediate shaft. Table III indicates schedules by which the clutch 158 and the transmission input clutch 26 are to be coupled and uncoupled.

Table III

| Mode of Operation | | Clutches | |
|---|---|---|---|
| | | 26 | 158 |
| Vehicle at rest | Engine at idle | x | x |
| | Flywheel to be charged, i.e., driven from engine | x | o |
| Acceleration | Vehicle to be driven from engine and flywhheel | o | o |
| Deceleration | Flywheel may be driven by excess of engine output depending upon energy level of flywheel | o | o |
| Braking | Engine braked upon by vehicle (Regenerative braking not applied) | o | x |

Figure 8:
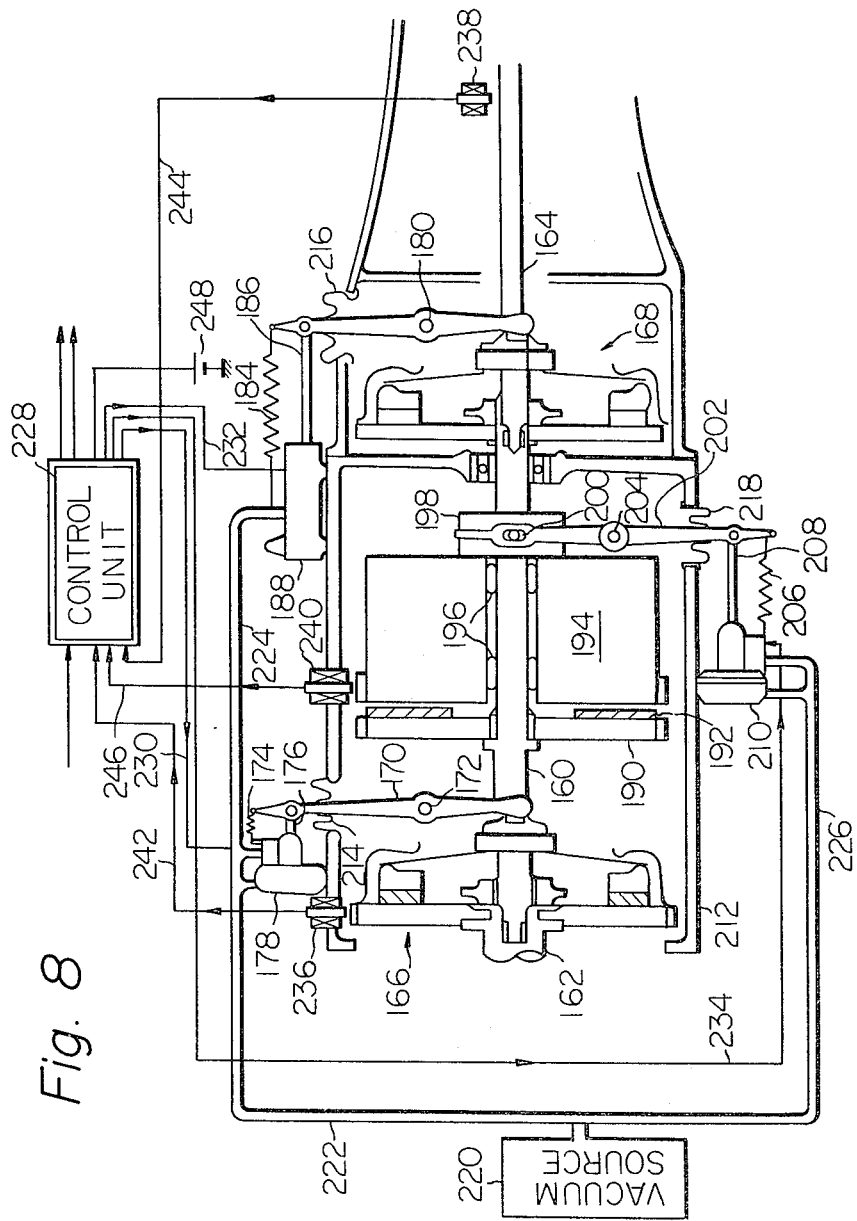
FIG. 8 is a schematic view, partly in section, another preferred embodiment of the hybrid power system according to the present invention.

FIG. 8 illustrates still another preferred embodiment of the hybrid power system according to the present invention. While the embodiments thus far described are adapted to drive the vehicle either independently of or cooperatively with the engine under various modes of operation of the vehicle, the hybrid power system herein shown in operative to drive the vehicle only when the vehicle is being started up from a halt during which the flywheel is maintained rotating. When the vehicle is started to a usual cruising speed, then the engine is started to drive the vehicle and the flywheel and, once the speed of rotation of the flywheel reaches a predetermined level, the flywheel is disconnected from the driveline.

Referring to FIG. 8, the hybrid power system comprises an intermediate shaft 160 which is in line with the crankshaft 162 of the engine (not shown) and an input shaft 164 of a transmission. The intermediate shaft 160 is engageable on its input side with the engine crankshaft 162 through a first clutch 166 and on its output side with the transmission input shaft 164 through a second clutch 168 which is adapted to be manually controlled similarly to the usual transmission input clutch. The first clutch 166 is coupled and uncoupled by means of a control lever 170 which is rotatable about a pivot 172. The lever 170 is constantly biased by a spring 174 to allow the clutch 166 into coupled condition and is connected through a plunger 176 to a solenoid-operated actuator 178. When energized, the solenoidoperated actuator 178 becomes operative to turn the control lever 170 about the pivot 172 against the opposing force of the spring 174 in a direction to bring the clutch 166 into uncoupled condition. Likewise, the second clutch 168 is coupled and uncoupled by means of a control lever 180 which is rotatable about a pivot 182 and which is urged by a spring 184 to a position allowing the clutch 168 into coupled condition. The control lever 180 is connected through a plunger 186 to a solenoid-operated actuator 188 which is adapted to become operative, when energized, to turn the lever 180 about the pivot 182 against the opposing force of the spring 184 in a direction to cause the clutch 168 to be uncoupled. The first and second clutches 166 and 168 are thus usually held in coupled conditions and are made uncoupled when the solenoid-operated actuators 178 and 188 respectively associated therewith are energized.

The intermediate shaft 160 securely carries thereon a disc plate 190 having a frictional facing 192 attached to one side thereof. The intermediate shaft 160 further has a flywheel 194 axially movably carried thereon through bearings 196, the flywheel being engageable with the facing 192 on the disc plate 190 when moved toward the disc plate. A pressing member 198 is attached to the flywheel 194 so as to be movable along the intermediate shaft 160 and independently of the shaft 160. The pressing member 198 is in movable engagement as at 200 with a control lever 202 which is rotatable about a pivot 204. The control lever 202 is constantly biased by a spring 206 to turn about the pivot 204 in a direction urging the pressing plate 198 and accordingly the flywheel 194 to be moved away from the disc plate 190. The control lever 202 is connected through a plunger 208 to a solenoid-operated actuator 210. The solenoid-operated actuator 210 is adapted to become operative, when energized, to turn the control lever 202 about the pivot 204 against the action of the spring 206 in a direction in which the pressing member 198 and accordingly the flywheel 194 are moved toward the disc plate 190. The flywheel 194 is thus biased by the spring 206 to be disengaged from the facing 192 on the disc plate 190 and is moved against the opposing force of the spring 206 into frictional engagement with the facing 192 of the disc plate 190 when the actuator 210 is energized. The intermediate shaft 160, the clutches 166 and 168, the control levers 170, 180 and 202, the flywheel 194 and the parts associated therewith are encased within a housing 212 having flexible dust covers 214, 216 and 218 through which the control levers 170, 180 and 202, respectively, project outwardly of the housing 212. The solenoid-operated actuators 178, 188 and 210 are herein assumed to be initiated into action pneumatically by the aid of a vacuum which is supplied from a vacuum source 220. The vacuum source 220 thus has an outlet port which is directed into vacuum inlet ports (not shown) of the actuators 178, 180 and 210 through vacuum passageways 222, 224 and 226, respectively.

The solenoid-operated actuators 178, 188 and 202 are selectively energized and de-denergized by an electric control unit 228 through lines 230, 232 and 234, respectively, which are connected between output terminals of the control unit 228 and input terminals of the actuators. The control unit 228 is adapted to be responsive to the revolution speeds of the engine crankshaft 162, the transmission input shaft 164 and the flywheel 194, the position of the clutch pedal to manually operate the clutch 168 or the neutral condition of the transmission, and the position and amount of travel of the accelerator pedal. Speed sensors 236, 238 and 240 are thus associated respectively with the engine crankshaft 162, the transmission input shaft 164 and the flywheel 194 and are connected to input terminals of the control unit 228 through lines 242, 244 and 246, respectively. Designated by reference numeral 248 is a power source to supply electric power to the control unit 228.

As will be understood from the description to be made later with reference to FIG. 9, the control unit 228 operates to control the actuators 178, 188 and 210 generally in the following manners.

When the motor vehicle is being driven from the engine, the actuators 178 and 188 are maintained de-energized for holding the first and second clutches 166 and 168, respectively, in coupled positions so that the revolution of the engine crankshaft 162 is transmitted through the intermediate shaft 160 to the transmission input shaft 164. If, under this condition, the actuator 210 is energized from the control unit 228, the control lever 202 is moved against the action of the spring 206 for moving the flywheel 194 into engagement with the facing 192 on the disc plate 190. The flywheel 194 is consequently driven by the intermediate shaft 160 through the disc plate 190 and thus stores thereon rotational energy until the flywheel is disengaged from the disc plate. If the vehicle is decelerated while the flywheel 194 is being driven from the engine, the control unit 228 acts to de-energize the actuator 210 so that the control lever 202 is moved to its initial position by the action of the spring 206 and thus causes the flywheel 194 to be disengaged from the disc plate 190.

When the vehicle is stopped temporarily as at a crossing of a road, the control unit 228 operates to automatically stop the engine while following the flywheel 194 to rotate on the intermediate shaft 160 by means of the rotational energy which has been stored thereon. When the vehicle is to be started from the temporary halt, then the control unit 228 acts to energize the actuator 210 for bringing the flywheel 194 into engagement with the disc plate 190 so that the transmission input shaft 164 is driven from the flywheel 194 when the clutch pedal is depressed to coupled the clutch 168. In this instance, the flywheel 194 is pressed against the facing 192 of the disc plate 190 with a pressure which is regulated by the control unit 228 to be substantially proportional to the amount of travel of the accelerator pedal so that the transmission input shaft 164 is driven to rotate at a speed selected by the accelerator pedal. When the rotational energy discharged from the flywheel 194 is thus dampened to such an extent as to be deficient to drive the vehicle, then the control unit 228 responds to such a condition and acts to start the engine for driving the vehicle from the engine.

To achieve the above described operations of the hybrid power system, the actuator 210 for the flywheel 194 id energized and de-energized in accordance with the following schedules.

When the vehicle is at rest as in a garage, the flywheel 194 is maintained at a standstill, having consumed its rotational energy which had been stored thereon during the preceding vehicle operation. The engine is thus started upon energization of the ignition system as in usual automotive engines and the flywheel 194 is maintained at rest during idling of the engine or before the vehicle is driven to move by the engine. When the accelerator pedal is depressed and the clutch pedal released to couple the clutch 168, the actuator 210 is energized so that the flywheel 194 starts to be driven from the engine while the vehicle is also driven from the engine. The actuator 210 is kept energized until the revolution speed of the flywheel 194 reaches a predetermined level of, for example, about 3,000 rpm. When, then, the accelerator pedal is moved back and gears are changed in the power transmission, the actuator 210 is de-energized so that the flywheel 194 ceases to be driven from the engine. After the gears are changed, the actuator 210 for the flywheel 194 will be driven for a second time provided the revolution speed of the engine is higher than the revolution speed of the flywheel 194 or, in other words, the actuator 210 for the flywheel 194 will be kept de-energized if the revolution speed of the engine is lower than the speed of revolution of the flywheel 194. When the revolution speed of the flywheel 194 reaches the predetermined level of, say, about 3,000 rpm, then the actuator 210 for the flywheel 194 is de-energized so that the flywheel 194 is disconnected from the engine. If, however, the revolution speed of the flywheel 194 thus disconnected from the engine declines to a predetermined level of, for example, about 2,000 rpm while the vehicle is being driven from the engine, the actuator 210 becomes energized for a second time so that the flywheel 194 is again driven from the engine until the revolution speed thereof reaches the predetermined speed of 3,000 rpm.

During deceleration of the engine, the control unit 228 acts to de-energize the actuator 210 for the flywheel 194 which consequently is disconnected from the disc plate 190. When the accelerator pedal is released and the clutch pedal depressed to uncouple the clutch 168 and thus the vehicle is brought to a halt, then the ignition plug of the engine becomes de-energized under the control of the control unit 228 whereby the engine stops.

When the vehicle is to be started from the halt with the flywheel 194 kept rotating, the vehicle will be driven from the flywheel 194 when the accelerator pedal is depressed and the clutch pedal released to couple the clutch 168 if the revolution speed of the flywheel 194 is higher than the predetermined level of, say, 2,000 rpm. The vehicle can be accelerated as the accelerator pedal is depressed deeper and accordingly the flywheel 194 is pressed against the facing 192 of the disc plate 190 with an increasing pressure, as previously noted.

When the revolution speed of the flywheel 194 droops down to the predetermined speed of 2,000 rpm while the vehicle is being driven from the flywheel 194, then the control unit 228 acts to energize the actuator 188 for the clutch 168 which is consequently uncoupled to disconnect the transmission input shaft 124 from the intermediate shaft 160. Under this condition, the intermediate shaft 160 is in driving relation to the engine crankshaft 162 so that the engine is cranked by the flywheel 194 while the vehicle is being driven by its enertia. Immediately after the engine is started, there exists a differential speed between the engine and the transmission input shaft so that the throttle valve of the engine should be controlled in relation to such a differential speed by the control unit 228. When synchronism is achieved between the revolution speeds of the engine crankshaft and the transmission input shaft, then the control unit 228 acts to allow the clutch 168 to be coupled so that the vehicle is driven from the engine.

Figure 9A:
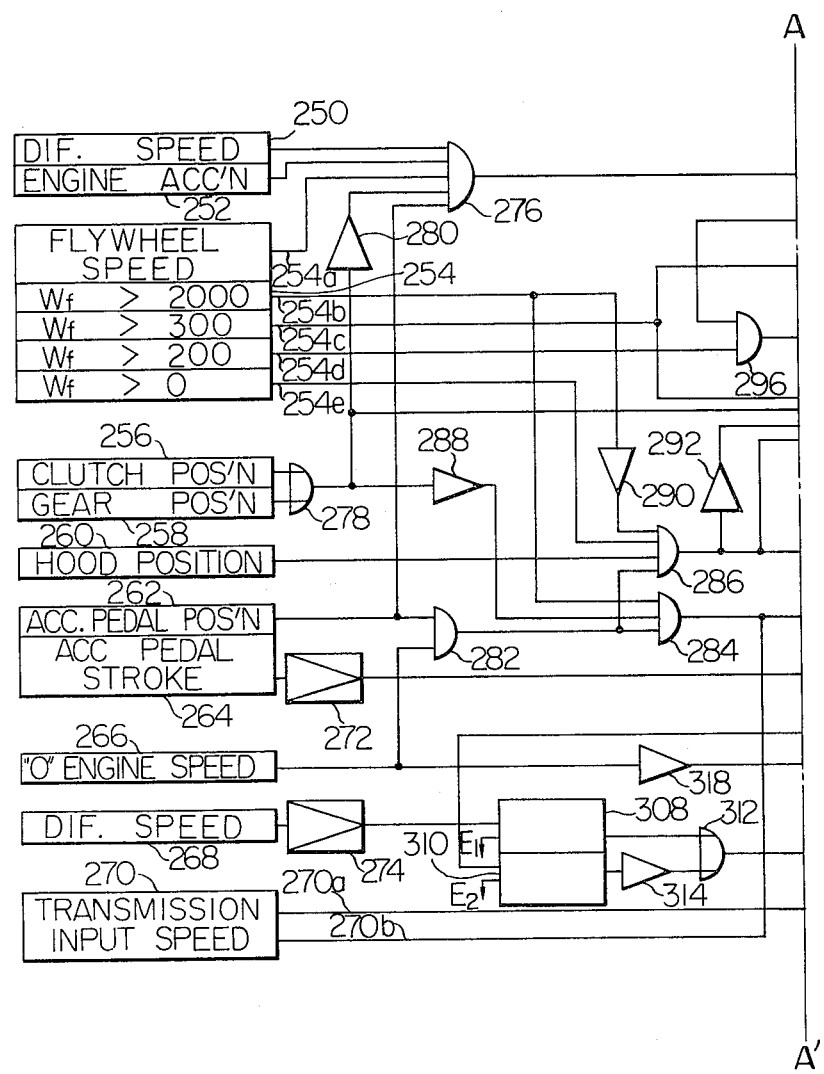
FIGS. 9a and 9B are a diagrammatic view showing a preferred example of an electric control arrangement to be incorporated into the power system illustrated in FIG. 8.
Figure 9B:
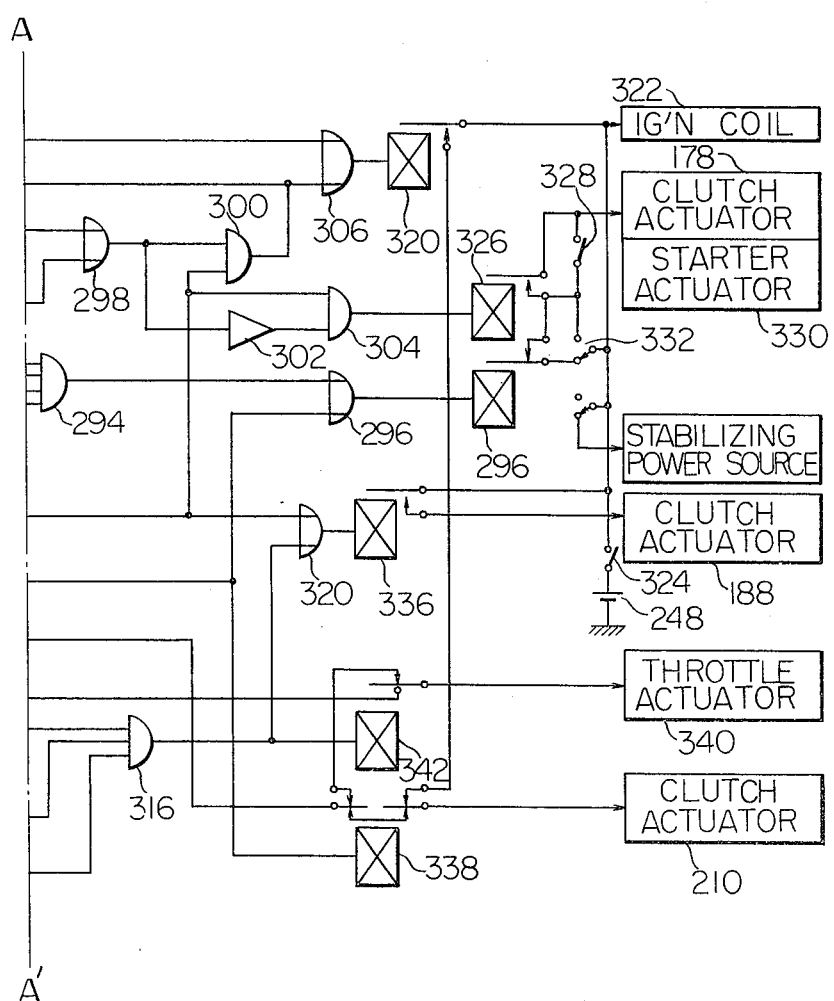

FIG. 9 illustrates a preferred example of the electric control unit 228 to achieve these operations of the hybrid power system shown in FIG. 8.

Referring to FIG. 8, the control unit comprises signal generators 250 to 270 which are responsive to various operational variables of the motor vehicle. The signal generator 250 is responsive to the revolution speeds of both the crankshaft 162 of the engine and the flywheel 194 and produces a signal of logical 1 when the former is higher than the latter. The signal generator 252 is actually a differentiating circuit which is responsive to the revolution speed of the engine crankshaft 162 and is operative to differentiate with respect to time an input voltage representing the revolution speed of the crankshaft 162, producing a signal of logical 1 when the rate of acceleration of the crankshaft 162 is of a positive value. The signal generator 254 is responsive to the revolution speed, herein denoted by $Wf$, of the flywheel 194 and has five output terminals 254a to 254e. A signal of logical 1 appears on the output terminal 254a when the flywheel 194 is being driven up to a first reference speed of, for example, 3,000 rpm and a signal of logical 0 appears thereon when the revolution speed of the flywheel 194 is being reduced from the first reference level toward a second reference level of, for example, 2,000 rpm. When the revolution speed of the flywheel 194 is reduced to the second reference level of, say, 2.000 rpm, then the flywheel 194 is driven from the engine and consequently the revolution speed thereof rises toward the first reference level of 3,000 rpm so that the signal of logical 1 will be present on the output terminal 254 for a second time. The signal generator 254, furthermore, produces a signal of logical 1 on the second output terminal 254b in response to a flywheel speed higher than the second reference level of 2,000, on the third output terminal 254c in response to a flywheel speed higher than a third reference level of, for example of 300 rpm, on the fourth output terminal 254d in response to a flywheel speed higher than a fourth reference level of, for example, 200 rpm, and on the fifth output terminal 254e in response to a flywheel speed higher than zero. A signal of logical 0 is present on each of the output terminals 254b to 254e when the revolution speed of the flywheel 194 is lower than the reference level which is allocated to the perticular output terminal.

The signal generator 256 is responsive to the position of the clutch pedal to control the clutch 168 and thus produces a signal of logical 1 when the clutch pedal is being depressed to uncouple the clutch 168. The signal generator 258, on the other hand, is responsive to the neutral condition of the transmission and produces a signal of logical 1 when gears are shifted in the transmission to establish the neutral condition.

The signal generator 260 is a sensor which is preferably provided for the purpose the precluding a danger of the engine being started when the hood of the engine compartment is left open. Thus, the signal generator 260 is responsive to the position of the hood of the engine compartment and produces a signal of logical 1 when the hood is closed. The signal generators 262 and 264 are responsive to the position of the accelerator pedal, of which the former produces a signal of logical 1 when the accelerator pedal is being depressed and the latter produces a signal voltage which is proportional to an amount of travel of the accelerator pedal being depressed. The signal generator 266 is responsive to the revolution speed of the engine crankshaft 162 and produces a signal of logical 1 when the crankshaft is at a standstill, viz., in response to a zero engine speed. The signal generator 268 is responsive to the revolution speeds of both the engine crankshaft 162 and the transmission input shaft 164 and produces a signal voltage which is proportional to a differential between the engine crankshaft and the transmission input shaft. The signal voltages delivered from the accelerator pedal stroke signal generator 264 and the engine-transmission differential speed signal generator 268 above mentioned are amplified by means of servo amplifiers 272 and 274, respectively. The signal generator 270 is responsive to the revolution speed of the transmission input shaft 162 and produces a signal of logical 1 on its output terminal 270a in response to a transmission input speed higher than a first reference level of, for example, 500 rpm and on its output terminal 270b in response to a zero transmission input speed, viz., when the transmission input shaft 162 is not being driven from either the engine or the flywheel or the vehicle is held at a standstill.

The output terminals of the engine-flywheel differential speed responsive signal generator 250, the engine acceleration responsive signal generator 254 and the accelerator pedal position responsive signal generator 262, and the first output terminal 254a of the flywheel speed responsive signal generator 254 are connected to input terminals of a logical AND circuit 276. The output terminals of the clutch position responsive signal generator 256 and the transmission neutral position responsive signal generator 258 are connected to input terminals of a logical OR circuit 278 which has an output terminal connected to the fifth input terminal of the AND circuit 276 through a logical NOT circuit 280. the AND circuit 276 thus produces a logical 1 signal when those conditions are concurrently established in which the engine speed is increasing and higher than the flywheel speed; the flywheel speed is being increased toward the first reference level of, say, 3,000 rpm; the clutch 168 is coupled and the transmission gears off the neutral positions so that the OR circuit 278 is producing a logical 0 signal; and the accelerator pedal is being depressed.

A second logical AND circuit 282 has input terminals which are respectively connected to the output terminals of the accelerator pedal position responsive signal generator 262 and the zero engine speed responsive signal generator 266. The second AND circuit 282 has an output terminal connected to input terminals of third and fourth logical AND circuits 284 and 286, respectively. The third AND circuit 284 has other input terminals connected to the second output terminal 254b of the flywheel speed responsive signal generator 254 and, through a logical NOT circuit 288 to the output terminal of the OR circuit 278. The AND circuit 284 thus produces a signal 1 signal when the flywheel 194 is rotating at a speed higher than the first reference level of, for example, 2,000 rpm; the clutch 168 is coupled and the transmission is off the neutral condition so that the OR circuit 278 is producing a logical 0 signal; and the accelerator pedal is being depressed and concurrently the engine is at rest so that the second AND circuit 282 is producing a logical 1 signal. The fourth AND circuit 286, on the other hand, has other input terminals connected through a logical NOT circuit 290 to the second output terminal 254b of the flywheel speed responsive signal generator 254 and directly to the fifth output terminal 254e of the flywheel speed responsive signal generator 254 and to the output terminal of the hood position responsive signal generator 260. The fourth AND circuit 286 thus produces a logical 1 output signal when the flywheel 194 is rotating at a speed higher than zero and lower than the second reference level of, say, 2,000 rpm; the hood of the engine compartment is closed; and the accelerator pedal is being depressed with the engine at rest so that the second AND circuit 282 is producing the logical 1 output signal. The output signal from the fourth AND circuit 286 is thus intended to start the engine by the flywheel 194 with the clutch 168 uncoupled.

The fourth AND circuit 286 has an output terminal connected through a logical NOT circuit 292 to a fifth logical AND circuit 294 which has other input terminals connected to the output terminals of the third output terminal 254c of the flywheel speed responsive signal generator 254, the OR circuit 278, and the second output terminal 270b of the transmission input speed responsive signal generator 270. A logical 1 output signal is thus produced from the fifth AND circuit 294 when the fourth AND circuit 286 is producing a logical 0 output signal; the flywheel 194 is rotating at a speed higher than the third reference level of, say, 300 rpm; the OR circuit 278 is producing the logical 1 output signal; and the transmission input shaft 164 is held at rest. The third and fifth AND circuits 284 and 294 have respective output terminals connected to input terminals of a second logical OR circuit 296 which thus produces a logical 1 output signal when a logical 1 output signal is being produced from at least either of the AND circuits 284 and 294. The second OR circuit 296 is intended to stop the engine when the accelerator pedal is released and the clutch pedal depressed so that the vehicle is brought to a halt.

A sixth logical AND circuit 296 has input terminals which are connected to the fourth output terminal 254d of the flywheel speed responsive signal generator 254 and to an output terminal of a seventh logical AND circuit to be described later. The output terminal of the sixth AND circuit 296 is connected to an input terminal of a third logical OR circuit 298 which has another input terminal connected to the third output terminal 254c of the flywheel speed responsive signal generator 254 so that a logical 1 output signal is produced from the third OR circuit 298 in the presence of the logical 1 output signal or signals on the third output terminal 254c of the signal generator 254 and/or the output terminal of the sixth AND circuit 296. The output terminal of the third OR circuit 298 is connected on one hand to an input terminal of the above mentioned seventh logical AND circuit which is designated by reference numeral 300 and, on the other hand, through a logical NOT circuit 302 to an eighth logical AND circuit 304. The eighth AND circuit 304 is intended to control the starter motor (not shown) which may be provided for the reason to be explained. The output terminal of the seventh AND circuit 300 is connected on one hand to the input terminal of the sixth AND circuit 296 as previously described and on the other hand to an input terminal of a fourth logical OR circuit 306 which has another input terminal connected to the output terminal of the first AND circuit 276. This fourth OR circuit 306 is intended to produce a control signal by which the engine is started by the flywheel or the flywheel is driven by the engine while the vehicle is being driven from the engine.

The signal voltage produced from the engine-transmission differential speed responsive signal generator 268 and amplified by the servo amplifier 274 is delivered to respective input terminals of first and second comparator circuits 308 and 310 on which first and second reference voltages $E_1$ and $E_2$, respectively, are constantly impressed. These reference voltages $E_1$ and $E_2$ are representative of relatively large and small differential speeds, respectively, between the revolution speeds of the engine crankshaft 162 and the transmission input shaft 164. The first and second comparator circuits 308 and 310 thus produce respective outputs when the amplified signal voltage from the servo amplifier 274 is lower than the reference voltages $E_1$ and $E_2$, respectively. The first comparator circuit 308 has an output terminal connected to one input terminal of a fifth logical OR circuit 312 while the second comparator circuit 310 has an output terminal which is connected through a logical NOT circuit 314 to the other input terminal of the OR circuit 312. The fifth OR circuit 312 thus delivers an output signal of logical 1 when the voltage from the servo amplifier 274 is lower than the higher reference voltage $E_1$ and higher than the lower reference voltage $E_2$, viz., the differential speed between the engine crankshaft 162 and the transmission input shaft 164 is within a predetermined range corresponding to the range between the voltages $E_1$ and $E_2$.

A ninth logical AND circuit has one input terminal connected through a logical NOT circuit 318 to the output terminal of the zero engine speed responsive signal generator 266 and other input terminals connected directly to the output terminal of the above mentioned fifth OR circuit 312 and to the first output terminal 270a of the transmission input speed responsive signal generator 270. The ninth AND circuit 316 thus produces an output signal of logical 1 when the engine is operating and concurrently the transmission input shaft 164 is being driven at a speed higher than the predetermined level of, say, 500 rpm as previously mentioned and, at the same time, the differential speed between the engine and the transmission input shaft is limited within a predetermined range. The AND circuit 316 has an output terminal connected to a sixth logical OR circuit 320 which has another input terminal connected to the output terminal of the previously described fourth AND circuit 286, the OR circuit 320 thus producing a logical 1 output signal when at least either of the AND circuits 286 and 316 is producing its logical 1 output signal.

The control signal from the fourth AND circuit 306 is delivered to a first relay 320 which is connected to an ignition coil 322 through an ignition switch 324. The control signal from the eighth AND circuit 304 is delivered to a second relay 326 which is connected to the actuator 178 for the clutch 166 through a switch 328 interlocked with the ignition switch 324 and, preferably, to an actuator 330 for the engine starter motor (not shown) through a two-position switch 332. The two-position switch 332 is adapted to be manually operated so that the engine can be started by means of the engine starter motor as in a usual motor vehicle when the vehicle is to cruise in suburban areas where the vehicle is not required to stop and start frequently and where contamination of air by the exhaust gases of the engine is not a serious problem. The actuator 330 for the starter motor is energized by the action of a third relay 334 which in turn is controlled by the control signal from the second OR circuit 296.

The control signal from the sixth OR circuit 320 is delivered to a fourth relay 336 which has an output terminal connected to the actuator 188 for the transmission input clutch 168. The control signal from the third AND circuit 284 is delivered to a fifth relay 338 which has an output terminal connected to the actuator 210 for the flywheel 194. The clutch actuator 210 also receives the emplified signal voltage from the servo amplifier 272 connected to the accelerator pedal stroke responsive signal generator 264 so that the actuator 210 is energized with a voltage proportional to the voltage delivered from the servo amplifier 272. The flywheel 194 is in this manner pressed against the facing 192 on the disc plate 190 with a pressure which is substantially proportional to the depth of the accelerator pedal depressed.

When the power output from the engine is not transmitted or only partly transmitted to the transmission input shaft 164, it is desired that the throttle valve of the carburetor be controlled independently of the position or the travel of the accelerator pedal. An actuator 340 is therefore provided so as to actuate a servo motor (not shown) for moving the throttle valve. The actuator 340 is energized and de-energized by the action of a sixth relay 342 which receives the control signal from the ninth AND circuit 316 and the amplified signal voltages from the servo amplifiers 272 and 274 connected to the accelerator pedal stroke responsive signal generator 264 and the engine-transmission differential speed responsive signal generator 268. The throttle actuator 340 is thus energized with a voltage proportional to the voltage supplied from the servo amplifier 272 or 274 so that the throttle valve in the carburetor can be controlled in accordance with the depth of the accelerator pedal depressed or the differential speed between the engine crankshaft 162 and the transmission input shaft 164.

Figure 10:
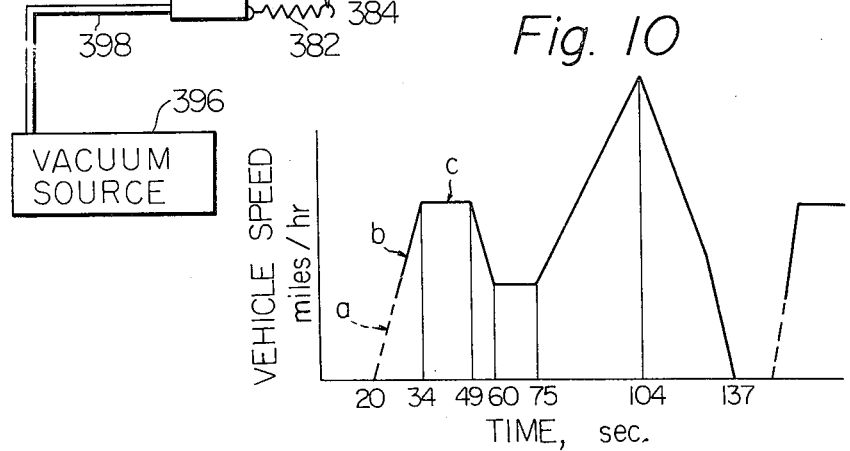
FIG. 10 is a graph illustrating various modes of operation of a motor vehicle equipped with the hybrid power system according to the present invention.

FIG. 10 illustrates modes of operation, by way of example, of a motor vehicle driven by the hybrid power system above described, wherein the axis of abscissa indicates time in seconds and the axis of ordinate indicates the speed of the vehicle in miles per hour. When, thus, the motor vehicle is started from the rest as indicated by section $a$ of the curve, the vehicle is accelerated by the energy supplied from the flywheel until the engine becomes operative to drive the vehicle as indicated by section $b$ of the curve. When the motor vehicle is driven by the engine in such a condition, the flywheel is charged with additional rotational energy from the engine and the energy thus stored on the flywheel is maintained while the vehicle is being driven at a constant speed as indicated by section $c$ of the curve. If, then, the vehicle is decelerated as indicated by section $d$ of the curve and thereafter driven at a constant but reduced speed as indicated by section $e$, the flywheel receives no additional energy from the engine. When, however, the motor vehicle is accelerated for a second time as indicated by section $f$, then the flywheel is driven from the engine and thus stores thereon additional energy. The motor vehicle then slows down and brought to a full stop as indicated by $g$ and $h$, respectively. The modes of operation above mentioned will be repeated when the motor vehicle is started from the halt.

Figure 11:
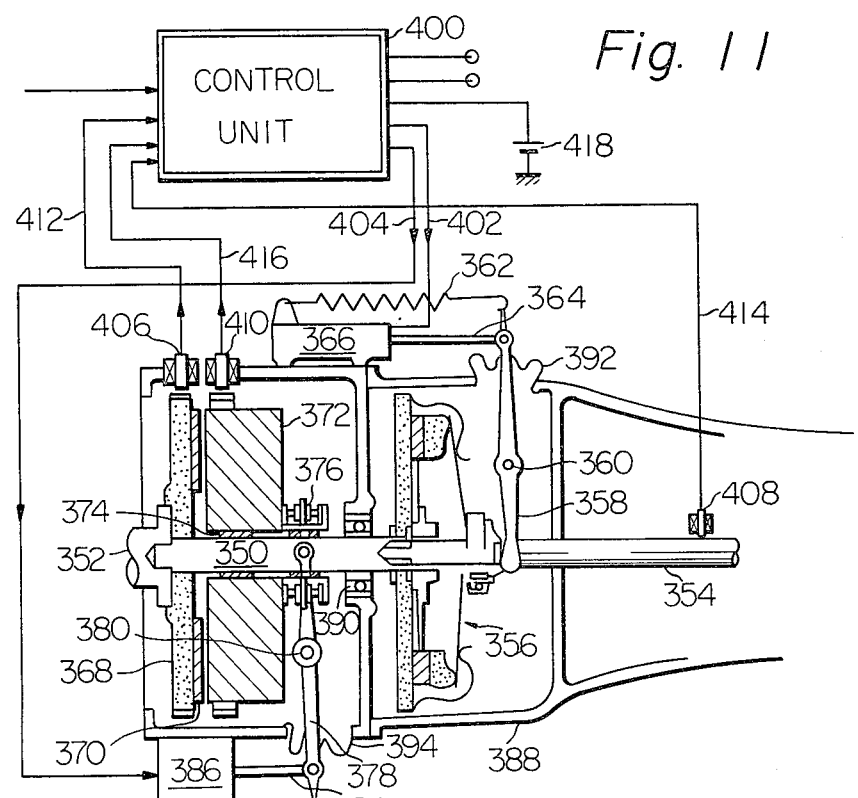
FIG. 11 is a schematic view which shows, partly in section, still another preferred embodiment of the hybrid power system according to the present invention.

FIG. 11 illustrates still another preferred embodiment of the hybrid power system according to the present invention. While the various embodiment thus far described are adapted to drive the vehicle under prescribed modes of operation of the vehicle, the hybrid power system shown in FIG. 11 is intended to drive the engine when the vehicle is to be started from a temporary halt.

Referring to FIG. 11, the hybrid power system of this nature comprises an intermediate shaft 350 which is connected at one to the crankshaft 352 of the engine (not shown) and which is drivingly engageable at the other end with the input shaft 354 of the transmission through a transmission input clutch 356. The transmission input clutch 354 is not only operable in a manual fashion as usual but can be operated by means of an electric control unit to be described. The clutch 356 is thus engaged by a control lever 358 which is rotatable about a pivot 360. The control lever 358 is biased by a spring 362 in a direction to couple the clutch 356 so that the intermediate shaft 350 is usually in driving connection to the transmission input shaft 354. The control lever 358 is connected through a plunger 364 to a solenoid-operated actuator 366 which is adapted to be selectively energized and de-energized by means of the control unit to be described. When energized, the actuator 366 causes the control lever 358 to turn about the pivot 360 against the opposing force of the spring 362 in a direction to uncouple the clutch 356 so that the intermediate shaft 350 is disconnected from the transmission input shaft 354. The intermediate shaft 350 carries thereon a disc plate 368 having a frictional facing 370 and a flywheel 372 through bearings 374. The disc plate 368 is fixed on the intermediate shaft 350 and is accordingly rotatable therewith, while the flywheel 372 is axially movable on the shaft 350 and free to rotate on the shaft 350 when disengaged from the facing 370 on the disc plate 368. The flywheel 372 is connected to a pressing means 376 which is moved toward and away from the disc plate 368 by a control lever 378 which is rotatable about a pivot 380. The control lever 378 is biased by a spring 382 to rotate about the pivot 380 in a direction to urge the pressing means 376 and accordingly the flywheel 372 to move away from the disc plate 368 so that the flywheel 372 is biased to be disengaged from the facing 370 on the disc plate 368. The control lever 378 is connected through a plunger 384 to a solenoid-operated actuator 386 and is caused to rotate about the pivot 380 against the opposing force of the spring 382 in a direction to move the pressing means 376 toward the disc plate 368 so that the flywheel 172 is brought into frictional engagement with the facing 370 on the disc plate. The intermediate shaft 350, the clutch 356, the disc plate 368 and the flywheel 372 are all encased within a housing 388 on which the intermediate shaft 350 is rotatably supported through a bearing 390. The housing 388 is provided with flexible dust covers 392 and 394 through which the control levers 358 and 378, respectively, project outwardly of the housing 388. The solenoid-operated actuator 386 is operated in a pneumatic fashion by the aid of a vacuum supplied from a vacuum source 396 through a passageway 398.

The actuators 366 and 386 are electrically controlled by a centralized control unit 400 through lines 402 and 404, respectively, which are connected between input terminals of the actuators and output terminals of the control unit 400. The control unit 400 is adapted to be responsive to the revolution speeds of the engine crankshaft 352, the transmission input shaft 354 and the flywheel 372. Speed sensors 406, 408 and 410 are thus associated with the engine crankshaft 352, the transmission input shaft 354 and the flywheel 372, respectively, through lines 412, 414 and 416. The sensor 408 to detect the engine crankshaft 352 is herein shown as associated with the disc plate 368 on the intermediate shaft 350 because the disc plate 368 is constantly rotatable in unison with the engine crankshaft 352. Designated by reference numeral 418 is a power source to energize the control unit 400.

As will be understood in extenso from the description to be made with reference to FIG. 12, the electric control unit 400 is adapted to control the solenoid-operated actuators 366 and 386 generally in the following manners.

When the motor vehicle is being driven from the engine, the solenoid-actuated actuators 366 and 386 are maintained de-energized so that the clutch 356 is held coupled with the clutch pedal released and the flywheel 372 is held disconnected from the facing 370 on the disc plate 368 whereby the revolution of the engine crankshaft 352 is transmitted without change to the transmission input shaft 354 through the intermediate shaft 350. If, under this condition, the actuator 386 for the flywheel 372 is energized by the control unit 400, the control lever 378 is caused against the opposing force of the spring 382 to rotate about the pivot 380 in the direction to move the pressing means 376 toward the disc plate 368 so that the flywheel 372 is brought into frictional engagement with the facing 370 on the disc plate 368. The flywheel 372 is consequently driven by the engine crankshaft 352 through the disc plate 368 and thus stores thereon rotational energy until the flywheel is disengaged from the disc plate 368 by means of the control unit 400.

When the motor vehicle is brought to a halt as at a crossing of a road during cruising, the control unit 400 operates to automatically stop the engine by de-energizing the ignition coil and to energize the actuator 366 for causing the transmission input clutch 356 to be uncoupled. At the same time, the actuator 386 is de-energized by the control unit 400 so that the control lever 378 associated therewith is allowed to rotate about the pivot 380 by the action of the spring 382 whereby the flywheel 372 is moved away from the disc plate 368. Transfer of the driving force from the engine crankshaft 352 to the flywheel 372 is consequently interrupted and thus the flywheel 372 is left to turn by its stored rotational energy. When the motor vehicle is to be started to the temporary halt, then the control unit 400 acts to energize the actuator 386 for the flywheel 372 which is consequently brought into engagement with the facing 370 on the disc plate 368. The intermediate shaft 350 and accordingly the engine crankshaft 352 are driven from the flywheel 372 so that the engine is started from the rest. The vehicle will start when clutch pedal is depressed manually by the driver of the vehicle.

To achieve the above described various operations of the hybrid power system, the actuator 386 for the flywheel 372 is energized and de-energized in accordance with the schedules to be described in the following.

When the motor vehicle is to be started from a rest with the flywheel held at a standstill, the engine should be started in a usual manner by the use of an ignition key. The flywheel 372 is maintained inoperative during idling of the engine or before the vehicle is driven to move by the engine. When the acceleration pedal is depressed and the clutch pedal for the transmission input clutch 356 released, the actuator 386 for the flywheel 372 is energized by means of the control unit 400 so that the flywheel 372 is connected to the disc plate 368 and is accordingly driven from the engine. While the vehicle is being driven from the engine, the flywheel 372 is also driven from the engine until the revolution speed of the flywheel reaches a predetermined level of, for example, 1,500 rpm. When, then, the accelerator pedal is moved back and gears are changed in the power transmission, the actuator 386 is de-energized so that the flywheel 372 ceases to be driven from the engine. After the transmission gears have been changed, the actuator 368 will be driven for a second time from the engine provided the engine is driven at a speed higher than the speed of rotation of the flywheel 372 or, in other words, the actuator 386 will be kept de-energized and the flywheel 372 held disconnected from the disc plate 368 if the revolution speed of the engine is lower than that of the flywheel 372. When the predetermined speed of, say, 1,500 rpm is reached by the flywheel 372 which is being driven from the engine, then the actuator 368 is de-energized so that the flywheel 372 is disconnected from the engine crankshaft 352. If, however, the revolution speed of the flywheel 372 declines to a predetermined level of, for example, 1,000 rpm while the vehicle is cruising, the control unit 400 acts to energize the actuator 368 for causing the flywheel 372 to engage with the facing 370 on the disc plate 368 whereby additional rotational energy is accumulated on the flywheel 373 until the revolution speed of the flywheel reaches for a second time the predetermined level of 1,500 rpm as previously noted.

When the vehicle is being decelerated, the control unit 400 responds to a decreasing revolution speed of the engine and thus de-energizes the actuator 386 for disconnecting the flywheel 372 from the disc plate 368. If, in this condition, the accelerator pedal is released and the clutch pedal depressed to uncouple the transmission input clutch 356, the ignition coil of the engine is cut off from the power source and accordingly the engine stops when the vehicle speed reaches zero.

When the accelerator pedal is depressed with the transmission held in the neutral condition or with the transmission input clutch 356 held uncoupled while the vehicle is at rest, the control unit 400 acts to energize the actuator 368 for the flywheel 372 so that the engine starts to be driven from the flywheel 372. If, in this instance, the rotational energy stored on the flywheel 372 has declined to such a level as to be deficient to drive the engine, then the engine starter motor should be initiated into action so that the engine is cranked without aid of the flywheel 372. If, furthermore, the vehicle is stopped when the flywheel 372 is rotating at a speed higher than the predetermined level of, say, 1,000 rpm and the revolution speed of the flywheel has declined below the level during halt of the vehicle, it is also necessary that the starter motor ve actuated to start the engine. If the vehicle is brought to a halt with the flywheel 372 rotating at a speed lower than the predetermined level of 1,000 rpm, then the engine will continue to operate unless the ignition coil is kept energized.

Figure 12:
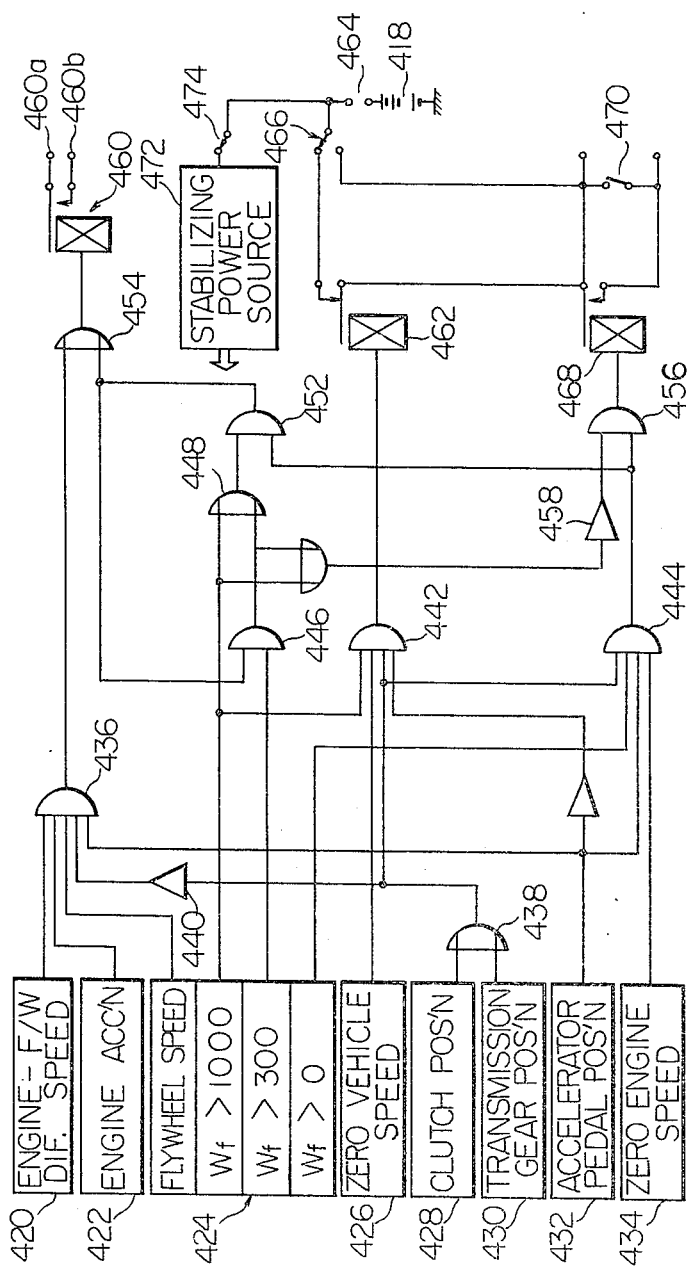
FIG. 12 is a diagrammatic view showing a preferred example of an electric control arrangement which is applicable to the power system illustrated in FIG. 11.

FIG. 12 illustrates a preferred example of the electric control unit 400 to achieve these operations of the hybrid power system.

Referring to FIG. 12, the control unit comprise generators 420 to 434 which are responsive to various operational variable of the motor vehicle. The signal generator 420 is responsive to the revolution speeds of both the engine crankshaft 352 and the flywheel 372 and produces a signal of logical 1 if the former is higher than the latter. The signal generator 422 is actually a differentiating circuit which is responsive to the revolution speed of the engine crankshaft 352 and is operative to differentiate an input voltage representative of the detected engine speed with respect to time for producing a signal of logical 1 when the rate of acceleration of the engine crankshaft is of a positive value, viz., the engine is driven at an increasing speed. The third signal generator 424 is responsive to the revolution speed $Wf$ of the flywheel 372 and has four output terminals 424a to 424d. A logical 1 signal appears on the first output terminal 424a when the flywheel 372 is being driven up to a first reference level of, for example, 1,500 rpm and a logical 0 signal appears on the output terminal 424a when the revolution speed of the flywheel 372 is being reduced from the first reference level toward a second reference level of, for example, 1,000 rpm. When the revolution speed of the flywheel 372 is reduced to the second reference level of, said, 1,000 rpm, then the flywheel 372 is driven from the engine and consequently the revolution speed thereof will rise toward the first reference level so that the signal of logical 1 will be present for a second time on the first output terminal 424a. The signal generator 424, furthermore, produces a signal of logical 1 on the second output terminal 424b in response to a flywheel speed higher than the second reference level of 1,000 rpm, on the third output terminal 424c in response to a flywheel speed higher than a third reference level of, for example, 300 rpm, and on the fourth output terminal 424d in response to a flywheel speed higher than zero. A signal of logical 0 will thus appear on each of the output terminals 424a to 424d of the signal generator 424 if the revolution speed of the flywheel 372 is lower than the reference level which is allocated to the particular output terminal.

The signal generator 426 is responsive to the vehicle speed and produces a signal of logical 1 when the vehicle is at rest, viz., in response to a zero vehicle speed. The signal generator 428 is responsive to the position of the clutch pedal and produces a signal of logical 1 when the clutch pedal is being depressed so that the transmission input clutch 356 is uncoupled. The signal generator 430 is responsive to the condition of the power transmission and produces a signal of logical 1 when the transmission is in a neutral condition. The signal generator 432 is responsive to the position of the accelerator pedal and produces a signal of logical 1 when the accelerator pedal is being depressed. The signal generator 434 is responsive to the revolution speed of the engine crankshaft 352 and produces a signal of logical 1 when the engine is at rest, viz., in response to a zero engine speed.

The output terminals of the engine-flywheel differential speed responsive signal generator 420, the engine acceleration responsive signal generator 422 and the accelerator pedal position responsive signal generator 432 and the first output terminal 424a of the flywheel speed responsive signal generator 424 are connected to input terminals of a first logical AND circuit 436. The output terminals of the clutch position responsive signal generator 428 and the transmission gear position responsive signal generator 430 are connected to input terminals of a first logical OR circuit 438. The OR circuit 438 has an output terminal connected through a logical NOT circuit 440 to another input terminal of the AND circuit 436. The AND circuit 436 thus produces a logical 1 signal when all those conditions are concurrently established in which the engine revolution speed is higher than the revolution speed of the flywheel 372; the engine is being accelerated; the flywheel 372 is being driven from the engine and is thus accelerated toward the first predetermined reference level of, say, 1,500 rpm; the clutch pedal is released to leave the transmission input clutch 356 coupled and simultaneously the power transmission is off the neutral position; and the accelerator pedal is being depressed.

The output terminal of the OR circuit 438 is also connected to input terminals of second and third logical AND circuits 442 and 444, respectively. The second AND circuit 442 has other input terminals connected to the second output terminal 424b of the flywheel speed responsive signal generator 424, the output terminal of the zero vehicle speed responsive signal generator 426, the output terminal of the OR circuit 438 and, through a logical NOT circuit 446, to the output terminal of the accelerator pedal position responsive signal generator 432. The second AND circuit 442 thus produces a signal of logical 1 when the flywheel 372 is rotating at a speed higher than the second predetermined reference level of, say, 1,000 rpm; the motor vehicle is brought to a standstill; the clutch pedal is depressed so that the transmission input clutch 356 is uncoupled and/or the neutral condition is selected in the transmission; and the accelerator pedal is kept released. The third AND circuit 444, on the other hand, has other input terminals which are connected to the output terminals of accelerator pedal position responsive signal generator 432 and the zero engine speed responsive signal generator 434 and the fourth output terminal 424d of the flywheel speed responsive signal generator 424. The third AND circuit 444 thus produces a signal of logical 1 when the flywheel 372 is rotating at any speed; the transmission input clutch 356 is uncoupled and/or the power transmission is in the neutral condition; the accelerator pedal is being depressed; and the engine is held at rest.

A fourth logical AND circuit 446 has an input terminal connected to the third output terminal 424c of the flywheel speed responsive signal generator 424 and an output terminal connected to respective input terminals of second and third logical OR circuits 448 and 450, respectively. Each of these second and third OR circuits 448 and 450 has another input terminal connected to the second output terminal 424b of the flywheel speed responsive signal generator 424. The OR circuits 448 and 450 thus produce their output signals of logical 1 when the preceding AND circuit 446 is producing its logical 1 output signal and concurrently the flywheel 372 is rotating at a speed higher than the second predetermined reference level of, say, 1,000 rpm.

A fifth logical AND circuit 452 has input terminals which are connected to the output terminals of the second OR circuit 448 and the third AND circuit 444 previously mentioned. The AND circuit has an output terminal connected on one hand to another input terminal of the fourth AND circuit 446 and an input terminal of a fourth logical OR circuit 454 which has another input terminal connected to the output terminal of the first AND circuit 436. The output terminal of the third AND circuit 444 is also connected to an input terminal of a sixth logical AND circuit 456 which has another input terminal connected through a logical NOT circuit 458 to the output terminal of the third OR circuit 450.

The control signal from the fourth OR circuit 454 is delivered to a first relay 460 which has an output terminal 460a connected to the actuator 366 for the transmission input clutch 356 and an output terminal 460b connected to the actuator 386 for the flywheel 372. The control signal from the second AND circuit 442 is delivered to a second relay 462 having an output terminal connected to the ignition coil (not shown) of the engine through an ignition switch 464 and a two-position switch 466 which is adapted to be manually operated when it is desired that the engine be started by means of the engine starter motor (not shown) as during cruising in suburban areas where the motor vehicle is not subject to frequent halts and where contamination of air is not a serious problem. A third relay 468 to actuate the starter motor is thus provided which has an input terminal connected to the output terminal of the sixth AND circuit 456 and an output terminal connected to the starter motor through a switch 470 which is interlocked with the ignition switch 464. Designated by reference numeral 472 is a stabilizing power source for the control unit. The stabilizing power source 472 is connected across a two-position switch 474 and the ignition switch 464 to the source of power 418.

From the foregoing description, it will now be understood that various advantages can be achieved in the hybrid power system according to the present invention, including:

1. Emission of toxic compounds from the exhaust system of the engine can be reduced, alleviating the air contamination problems.
2. The noises produced from the engine can be reduced.
3. The engine can be built in compact and small sized construction. Where the motor vehicle is driven only by the use of the engine as in the usual motor vehicles, the engine should have a capacity which is large enough to be competent for a maximum power output required of the motor vehicle. Since, however, the motor vehicle equipped with the hybrid power system according to the present invention is driven through cooperation of the engine and the flywheel during heavy load operation of the vehicle, the engine need not operate to provide such a large power output as required in the usual engines and, for this reason, the engine can be of small-sized construction.
4. Improved performance efficiency of the motor vehicle.
5. Increased reliability and stability of the engine operation since the engine is free from disproportionately heavy load, assuring prolonged service life of the engine.

What is claimed is:

1. A hybrid power system for a motor vehicle, comprising a prime mover, a power output shaft, an intermediate shaft connected between said prime mover and said power output shaft, releasable coupling means connected between said intermediate shaft and said power output shaft for disconnecting the power output shaft from the intermediate shaft when the coupling means is actuated, a flywheel releasably engaging said intermediate shaft, a stepless speed change unit interconnected between said flywheel and said intermediate shaft for steplessly varying a ratio between the revolution speeds of said intermediate shaft and said flywheel, and control means responsive to revolution speeds of said prime mover and said flywheel for producing a first signal representative of an amount of energy stored on said flywheel and a second signal representative of a differential speed between said prime mover and said flywheel, said control means comprising a signal generator which produce a first control signal when said first signal is representative of a flywheel energy larger than a first reference level, a second signal when said first signal is representative of a flywheel energy larger than a second reference level which is higher than said first reference level, and a third control signal when said first signal is representative of a flywheel energy larger than a third reference level which is higher than said second reference level, wherein the power output from said prime mover is imparted partly to said power output shaft and partly to said flywheel for increasing the energy on the flywheel when said second signal is smaller than a predetermined level and concurrently said first control signal is present and wherein said flywheel is disengaged from said prime mover in response to said third control signal and is brought into driving engagement with said power output shaft through said coupling means in response to said second control signal so that the power output shaft is driven from both said prime mover and said flywheel when the second control signal is present.

2. A hybrid power system as claimed in claim 1, in which said control means comprise a second signal generator responsive to the condition of said speed change unit for producing a fourth control signal representative of said ratio between the revolution speeds of said intermediate shaft and said flywheel, said speed change unit being controlled for equalizing the speeds of the intermediate shaft and the flywheel when the flywheel is disengaged from the intermediate shaft and accelerating or decelerating said flywheel when the flywheel is driven by the intermediate shaft or in driving engagement with the intermediate shaft.

3. A hybrid power system as claimed in claim 1, further comprising second releasable coupling means responsive to said first control signal for establishing driving connection from said intermediate shaft to said flywheel and third releasable coupling means responsive to said second control signal for establishing driving connection from said flywheel to said intermediate shaft.

4. A hybrid power system as claimed in claim 1, further comprising second releasable coupling means responsive to said first and second control signals for establishing driving connection from said intermediate shaft to said flywheel when the first control signal is present and establishing driving connection from the flywheel to the intermediate shaft when the second control signal is present.

5. A hybrid power system as claimed in claim 1, in which said control means is responsive to the degree of opening of the throttle of a fuel intake unit of said prime mover and to the vacuum developed downstream of said throttle for controlling the degree of opening of the throttle independently of an accelerator pedal position when the power output from said prime mover is totally imparted to said flywheel with said power output shaft at rest or imparted partly to the flywheel and partly to said power output shaft or when the power output shaft is driven by both the prime mover and the flywheel.

* * * * *